United States Patent
Kayama et al.

(10) Patent No.: US 8,860,978 B2
(45) Date of Patent: Oct. 14, 2014

(54) INFORMATION PROCESSING APPARATUS AND CONTROL METHOD THEREOF

(75) Inventors: Hiroyuki Kayama, Yokohama (JP); Tomoko Narukawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1390 days.

(21) Appl. No.: 12/127,936

(22) Filed: May 28, 2008

(65) Prior Publication Data

US 2008/0297839 A1    Dec. 4, 2008

(30) Foreign Application Priority Data

May 31, 2007    (JP) .................................. 2007-146106

(51) Int. Cl.
G06F 3/12    (2006.01)

(52) U.S. Cl.
CPC ............ *G06F 3/1253* (2013.01); *G06F 3/1204* (2013.01); *G06F 3/1222* (2013.01); *G06F 3/1205* (2013.01); *G06F 3/1285* (2013.01)
USPC ....................................................... 358/1.15

(58) Field of Classification Search
USPC ....................................................... 358/1.15
See application file for complete search history.

(56) References Cited

U.S. PATENT DOCUMENTS

| | | | |
|---|---|---|---|
| 2003/0011812 A1* | 1/2003 | Sesek et al. ................... | 358/1.15 |
| 2005/0200879 A1* | 9/2005 | Nakagiri et al. ............. | 358/1.13 |
| 2006/0209329 A1* | 9/2006 | Akiyama ...................... | 358/1.13 |
| 2006/0256360 A1* | 11/2006 | Kayama ......................... | 358/1.13 |
| 2007/0030507 A1* | 2/2007 | Kaneko ......................... | 358/1.13 |
| 2010/0011290 A1 | 1/2010 | Kaneko | |

FOREIGN PATENT DOCUMENTS

| | | |
|---|---|---|
| JP | 2000-357074 A | 12/2000 |
| JP | 2006-260245 A | 9/2006 |
| JP | 2007-042023 A | 2/2007 |

OTHER PUBLICATIONS

Japanese Office Action for corresponding JP 2008-134656, mail date Jul. 17, 2012.

* cited by examiner

*Primary Examiner* — Marivelisse Santiago Cordero
*Assistant Examiner* — Mesfin Getaneh
(74) *Attorney, Agent, or Firm* — Rossi, Kimms & McDowell LLP

(57) ABSTRACT

An information processing apparatus that improves operability, productivity and flexibility in print setting when collectively executing print jobs. If a print instruction is input, a job list display unit determines whether the instruction is directed to a plurality of job data items. If the instruction is directed to a plurality of job data items, it is determined whether or not to allow the user to confirm output settings for each individual print job. If the user confirms the output settings, a user interface for making a change to the output settings associated with each individual print job is displayed. The displayed output settings are the output settings saved together with the job data item. If the user does not confirm the output settings, the user interface is not displayed, and output settings and the corresponding job data item are associated with each other, and they are transferred to a printer.

14 Claims, 26 Drawing Sheets

F I G. 5
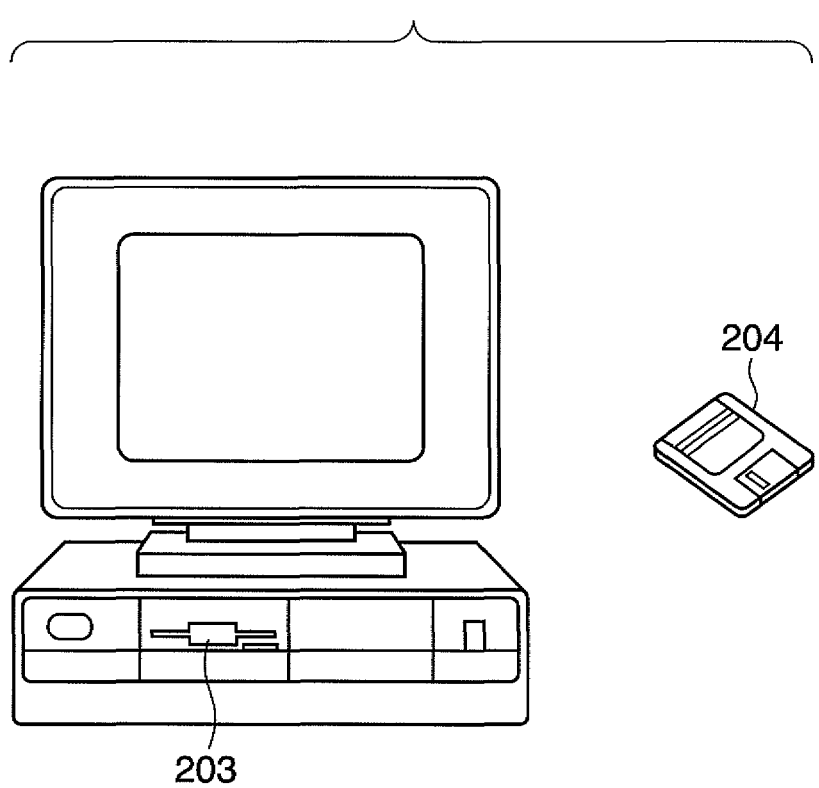

| JOB ID | JOB SAVE LOCATION | JOB NAME | GENERATED DATE / TIME |
|---|---|---|---|
| 1 | CLIENT COMPUTER | Job 1 | 03/12 14:11 |
| 2 | CLIENT COMPUTER | Job 2 | 03/12 10:20 |
| 3 | CLIENT COMPUTER | Job 3 | 03/14 11:35 |

FIG. 16

| JOB ID | SAVE LOCATION | JOB NAME | GENERATED DATE / TIME | INTERNAL JOB ID |
|---|---|---|---|---|
| 1 | CLIENT COMPUTER | Job 1 | 03/12 14:11 | |
| 2 | CLIENT COMPUTER | Job 2 | 03/12 10:20 | |
| 3 | CLIENT COMPUTER | Job 3 | 03/14 11:35 | |
| 4 | PRINTER A-BOX | Job 4 | 03/10 9:10 | 0x10010 |
| 5 | PRINTER A-BOX | Job 5 | 03/10 9:12 | 0x10011 |
| 6 | PRINTER A-BOX | Job 6 | 03/10 9:15 | 0x10012 |
| 7 | PRINTER B-BOX | Job 7 | 03/10 15:05 | 0x10100 |
| 8 | PRINTER B-BOX | Job 8 | 03/11 10:20 | 0x10101 |

FIG. 17

| SERIAL NUMBER | INTERNAL JOB ID | JOB NAME | GENERATED DATE / TIME | JOB ATTRIBUTES |
|---|---|---|---|---|
| 1101 | 0x10010 | Job 4 | 03/10 9:10 | 1 COPY, 10 PAGES |
| 1102 | 0x10011 | Job 5 | 03/10 9:12 | 1 COPY, 5 PAGES |
| 1103 | 0x10012 | Job 6 | 03/10 9:15 | 5 COPIES, 12 PAGES |

FIG. 23

SET PRINT ORDER

| JOB NAME | LOCATION | PRINT RANGE |
|---|---|---|
| Job 1 | CLIENT PC | 1-2 |
| Job 5 | PRINTER A | 1-25 |
| Job 4 | PRINTER A | 1-10 |
| Job 1 | CLIENT PC | 3-4 |

COPY | EDIT | DELETE | OK | CANCEL

FIG. 24

PRINT ☒

JOB NAME : Job 4

NUMBER OF COPIES (C) : [1] COPIES

PRINT RANGE : ⊙ ALL (A) :
○ SELECTED PAGES (P) : 1 FROM PAGE  12 TO PAGE

PRINT SETTINGS

OK | CANCEL

F I G. 27

2700

| JOB ID | SAVE LOCATION | JOB NAME | OUTPUT METHOD | PRINT RANGE | INTERNAL JOB ID |
|---|---|---|---|---|---|
| 1 | PRINTER A | Job 1 | SAVE | 1-2 | 0x10015 |
| 1 | CLIENT COMPUTER | Job 1 | SAVE | 3-10 | |
| 1 | PRINTER A | Job 1 | SAVE | 11-12 | 0x10015 |

F I G. 28

2800

| JOB ID | SAVE LOCATION | JOB NAME | GENERATED DATA / TIME | INTERNAL JOB ID |
|---|---|---|---|---|
| 1 | CLIENT COMPUTER | Job 2 | 03/12 10:20 | |

FIG. 31

| PRINT SETTINGS-SAVED JOB | ✕ |
|---|---|

| OUTPUT PAPER SIZE : | A4 |
|---|---|
| PRINT ORIENTATION : | PORTRAIT |
| PRINTING METHOD : | SINGLE-SIDED |
| PAGE LAYOUT : | 2 PAGES / SHEET |
| PAPER SOURCE : | CASSETTE 1 |
| PAPER OUTPUT DESTINATION : | TRAY 1 |
| MOVE PRINTABLE AREA : | SET |
| COLOR SETTINGS : | SET |

OK    CANCEL

FIG. 32

| PRINT SETTINGS-BOX JOB | ☒ |
|---|---|
| OUTPUT PAPER SIZE : | A4 ⌄ |
| PRINTING METHOD : | SINGLE-SIDED ⌄ |
| PAPER SOURCE : | CASSETTE 1 ⌄ |
| PAPER OUTPUT DESTINATION : | TRAY 1 ⌄ |
| MOVE PRINTABLE AREA : | SET |
| COLOR SETTINGS : | SET |
| | OK   CANCEL |

INFORMATION PROCESSING APPARATUS AND CONTROL METHOD THEREOF

BACKGROUND OF THE INVENTION

1. Field of the Invention

The present invention relates to, for example, an information processing apparatus and a control method thereof.

2. Description of the Related Art

A technique for collectively printing a plurality of documents that are stored in a client computer, a printer, or the like as print data has been implemented with the goal of improving user operability. Further, a technique for simplifying the task of making printing settings when collectively printing a plurality of documents is disclosed in, for example, Japanese Patent Laid-Open No. 2006-260245 (FIGS. 8, 10, 11, etc.). Specifically, according to Japanese Patent Laid-Open No. 2006-260245, print jobs are generated with print settings that correspond to a mode selected by the user from among a job integration mode, a common setting mode, and a normal mode. The job integration mode and the common setting mode are modes in which the print settings associated with the first of a plurality of generated print jobs are applied to all print jobs as common setting information. The normal mode is a mode in which the print settings originally set for each print job are applied.

However, according to the conventional technology described above, the common or original print settings are applied to all print jobs processed at a time, making it impossible to confirm the print settings for individual print jobs and change the print settings when necessary. In other words, in the common setting mode and in the job integration mode, if a change is made in the print settings, the change is reflected in the common settings information. For this reason, the changed print settings are applied to all the print jobs in which the common settings information has been reflected. Meanwhile, in the normal mode, the print settings can be changed for each individual print job, but because the print settings to which a change is made are associated with each individual print job, the normal mode is not suitable for such settings that partially change the common print settings.

SUMMARY OF THE INVENTION

The present invention has been conceived in view of the related art described above, and it is an object of the present invention to solve the above problems. Specifically, it is an object of the present invention to improve the operability, productivity, and flexibility in print setting when collectively executing a plurality of print jobs by making it possible, when executing a plurality of print jobs with a single print instruction, to select whether to accept print settings for each individual print job or execute a print job with the print settings associated with the print data (also referred to as "output data").

The present invention is configured as follows to achieve the above object. Specifically, the present invention is an information processing apparatus that transmits print data saved in association with output settings to a printer, the apparatus includes: a print instruction receiving unit adapted to receive an input of target print data (i.e., data to be printed) from among the print data saved in association with output settings, and a print instruction; a selection receiving unit adapted to receive a selection of whether or not to confirm print settings when a plurality of print data items have been selected to be printed by the print instruction receiving unit; a settings input unit adapted to receive an input of output settings for each print data item of the plurality of print data items to be output and saving the received output settings as output settings associated with the print data items, when a selection to confirm print settings has been received by the selection receiving unit; and a transmission unit adapted to transmit the print data items to be output and the output settings associated with the print data items to a designated printer.

The present invention makes it possible to select whether to accept print settings for each individual print job or execute a print job with the print settings associated with the print data (also referred to as "output data") when executing a plurality of print jobs with a single print instruction. Thereby, it is possible to attain the effect that the operability, productivity, and flexibility in print setting when collectively executing a plurality of print jobs can be improved.

Further features of the present invention will become apparent from the following description of exemplary embodiments with reference to the attached drawings.

BRIEF DESCRIPTION OF THE DRAWINGS

FIG. 5 is a diagram illustrating an FD drive and an FD inserted into the FD drive in the present invention.

FIG. 16 is a diagram illustrating a format of a job list that is managed by an information processing system according to Embodiment 2 of the present invention.

FIG. 17 is a diagram illustrating a format of a job management table that is managed by a printer according to Embodiment 2 of the present invention.

FIG. 23 is a diagram illustrating a user interface displayed when setting the print order of job data items in an information processing system according to Embodiment 2 of the present invention.

FIG. 24 is a diagram illustrating a user interface displayed when making output settings for job data of a printer in an information processing system according to Embodiment 2 of the present invention.

FIG. 27 is a diagram illustrating a format of a print list that is managed, through the process shown in FIGS. 25A and 25B, by an information processing system according to Embodiment 3 of the present invention.

FIG. 28 is a diagram illustrating a format of a print list that is managed by an information processing system according to Embodiment 3 of the present invention in the process of FIG. 26.

FIG. 31 is a diagram illustrating a user interface displayed when making detailed output settings (print settings) in an information processing system according to an embodiment of the present invention.

FIG. 32 is a diagram illustrating a user interface displayed when making detailed output settings (print settings) for job data of a printer in an information processing system according to Embodiment 2 of the present invention.

DESCRIPTION OF THE EMBODIMENTS

Hereinafter, preferred embodiments shall be described in detail with reference to the accompanying drawings.

Embodiment 1

Exemplary Configuration of Printing System

Figure 1:
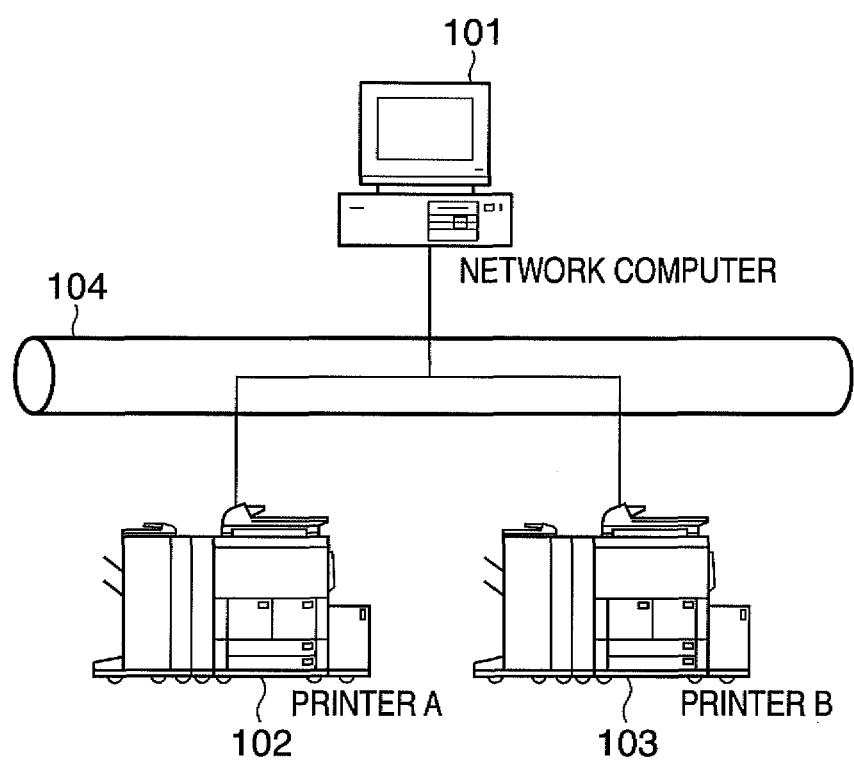
FIG. 1 is diagram illustrating the system configuration of an information processing system according to an embodiment of the present invention.

FIG. 1 is a diagram illustrating an overall configuration of an information processing system according to an embodiment of the present invention. It should be noted that the environment of the entire information processing system described below is merely an example designed to facilitate the understanding of the present invention, and the present invention is not intended to be limited to the environment described herein.

In FIG. 1, a computer 101 is a network computer (hereinafter referred to simply as "computer") that is connected to a network 104, such as an Ethernet® network, and can communicate therewith. The computer 101 is typically a personal computer (PC) The computer 101 can execute various programs such as application programs. The computer 101 has a function for transferring a print job, which includes output data generated by the computer 101 itself, to printers 102 and 103 that are connected to the network. The computer 101 can also acquire, display, and edit print job information that has been received and processed or saved by the printers 102 and 103.

The printers 102 and 103 are network printers (hereinafter referred to simply as "printers") that serve as print control apparatuses, and are connected to the network 104 through a network interface (not shown). The printers 102 and 103 analyze output data transmitted from the computer 101, convert the data into dot images, and print the images, on a page-by-page basis. The printers 102 and 103 also display the job data received from the computer 101 on their respective user interfaces, transmit the job data by email to the computer 101, or transmit the job data as a facsimile to a facsimile apparatus (not shown) or the like. Hereinafter, the printers 102 and 103 are sometimes referred to as "printer A" and "printer B", respectively, when it is necessary to distinguish between them. The functions of the printers may be different.

The network 104 is also connected to the computer 101, the printers 102 and 103, and the like.

<Exemplary Hardware Configuration of Network Computer>

Figure 2:
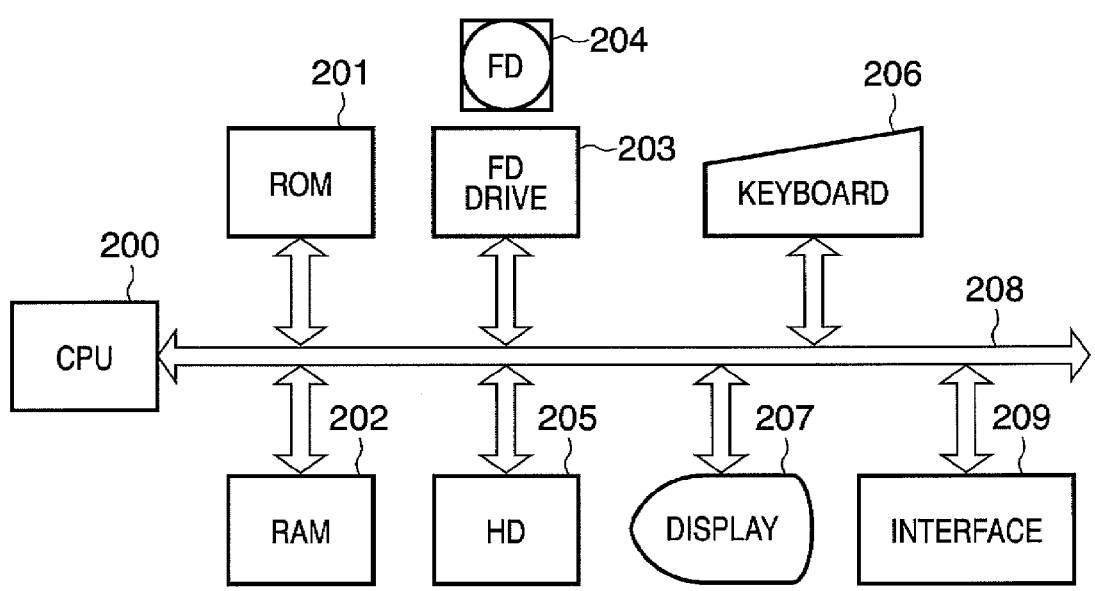
FIG. 2 is a block diagram illustrating a schematic configuration of the computer shown in FIG. 1.

FIG. 2 is a block diagram illustrating a configuration of the computer 101. In FIG. 2, a CPU 200 serves as a control unit and performs control of the entire apparatus. The CPU 200 executes application programs, printer driver programs, the OS, an information processing program of the present embodiment, and the like that are stored in a hard disk (HD) 205. The CPU 200 also performs control to temporarily store, in a RAM 202, information, files, and the like that are necessary to execute programs. A ROM 201 is a storage unit that stores programs, such as a basic I/O program, and various data such as font data and template data used in word processing. The RAM 202 is a temporary storage unit, and functions as a main memory, working area, and the like for CPU 200.

A flexible disk drive 203 functions as a unit for reading data from storage media, and can load a program or the like stored in an FD 204 serving as a storage medium into the computer as shown in FIG. 5. The FD 204 is a storage medium in which a program is stored in a manner in which the computer can read and write data therefrom/thereto. It is also possible to use, instead of the FD, a storage medium such as a CD-ROM, CDR, CDRW, PC card, DVD, IC memory card, MO, or memory stick as an external storage medium. The hard disk 205 serves as an external storage unit, and stores application programs, printer driver programs, the OS, an information processing program, associated programs, data files, etc.

A keyboard 206 is an instruction input unit that receives commands for controlling devices entered by the user to the computer. A display 207 is a display unit that displays the commands inputted from the keyboard 206, the state of a printer, etc. A system bus 208 controls the flow of data, control signals, or the like in the computer. An interface 209 is an input/output unit that communicates with external apparatuses, and the computer exchanges data with external apparatuses through the interface 209.

The configuration of the computer shown in FIG. 2 is merely exemplary, and the configuration of the computer is not intended to be limited to the exemplary configuration shown in FIG. 2. For example, the storage locations of the data and programs may be alternated among the ROM, RAM, HD, or the like according to their characteristics.

Figure 3:
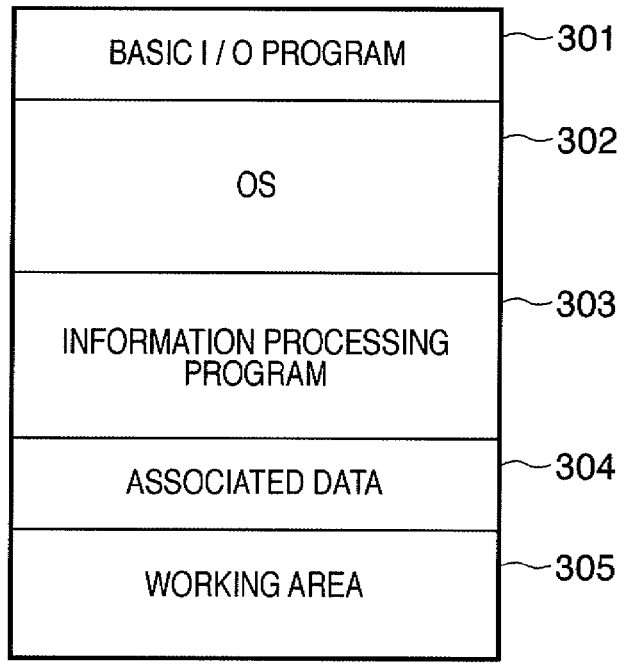
FIG. 3 is a diagram of a memory map when a program in the FD shown in FIG. 4 is loaded into the RAM shown in FIG. 2.

FIG. 3 is a diagram illustrating an example of a memory map of the RAM 202 shown in FIG. 2, showing a state in which an information processing program that controls the information processing system of the present invention has been loaded from the FD 204 into the RAM 202 and is executable. The present embodiment shows an example in which the information processing program and the associated data are loaded from the FD 204 directly to the RAM 202 and then executed. It is also possible to load the information processing program from the HD 205, in which the information processing program has already been installed from the FD 204, into the RAM 202 every time the information processing program is run. The medium that stores the information processing program of the present invention may be a CD-ROM, CDR, PC card, DVD, or IC memory card, instead of an FD. It is also possible to implement a configuration such that the information processing program of the present invention stored in the ROM 201 constitutes a part of the memory map, and is executed directly by the CPU 200. Furthermore, a configuration in which software that implements the functions of the apparatuses described above is used as an alternative for the hardware apparatuses is also possible.

The basic I/O program 301 is a region that stores a program having an IPL (initial program loading) function for causing the OS to be loaded from the HD 205 into the RAM 202 to start the operation of the OS when the computer is turned on. The operating system (OS) 302 provides an input/output interface for applications and a resource management function. The information processing program 303 is stored in a region secured in the RAM 202. The associated data 304 is stored in a region secured in the RAM 202. The working area 305 secures a region in which the CPU 200 executes the information processing program of the present embodiment.

Figure 4:
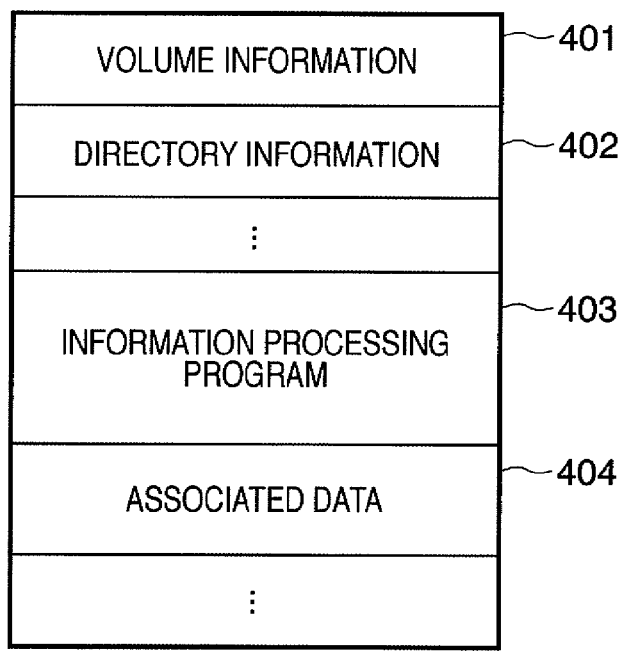
FIG. 4 is a diagram of a memory map that shows the data stored in the FD shown FIG. 2.

FIG. 4 is a diagram illustrating an example of a memory map of the FD 204 shown in FIG. 2. In FIG. 4, volume information 401 indicates data information. Directory information 402 is information regarding the location of data, program files, etc. An information processing program 403 is the program discussed in the present embodiment, and associated data 404 is data handled by the information processing program 403. The information processing program 403 is a program obtained by converting the flowchart described in the present embodiment into a program.

FIG. 5 is a diagram illustrating the FD drive 203 shown in FIG. 2 and the FD 204 inserted into the FD drive 203. The same reference numerals are assigned to the same components as those of FIG. 2. In FIG. 5, the FD 204 stores the information processing program described in the present embodiment and the associated data.

Exemplary Software Configuration according to the Present Embodiment

Figure 6:
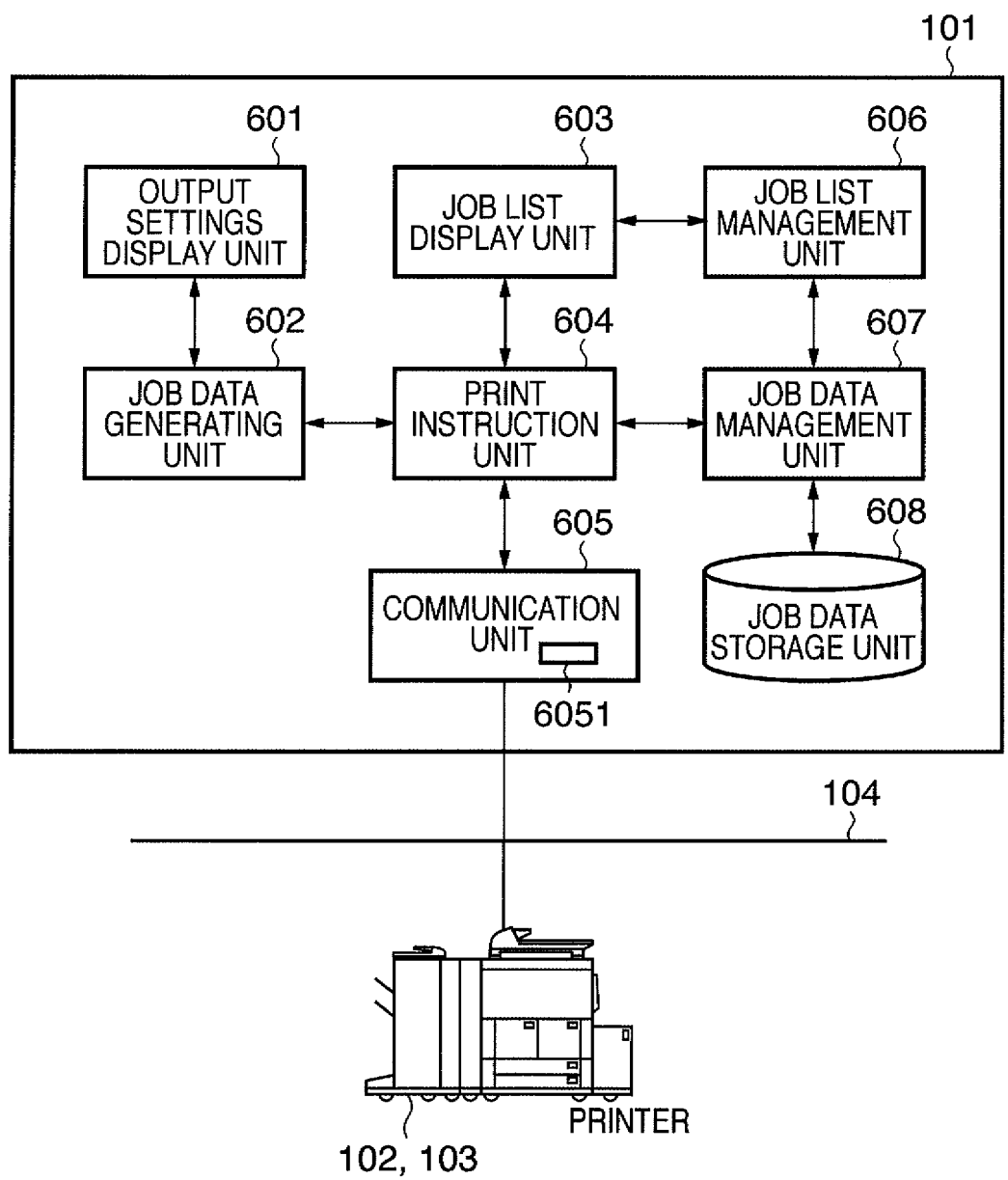
FIG. 6 is a diagram illustrating an example of a software configuration of an information processing system according to an embodiment of the present invention.
Figure 13:
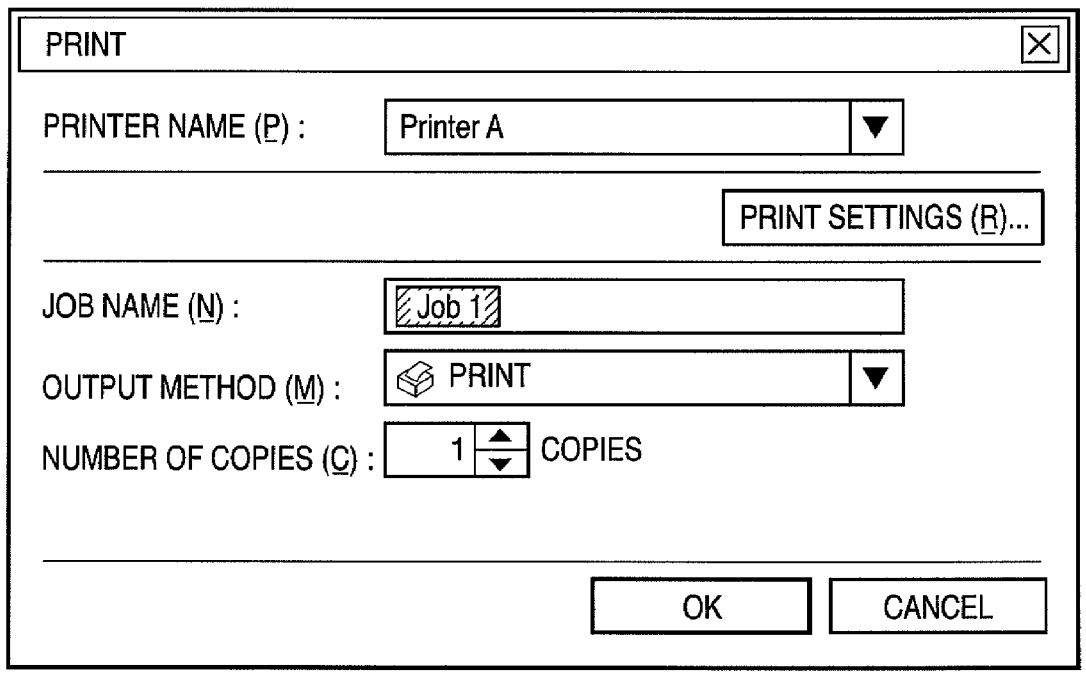
FIG. 13 is a diagram illustrating a user interface displayed when output settings are performed in an information processing system according to an embodiment of the present invention.

FIG. 6 is a diagram illustrating a configuration of the functional modules of the information processing system of the present embodiment. The modules are implemented by the CPU that executes programs such as the OS and applications by controlling hardware such as the memory, the hard disk, the display, and a communication interface by the CPU. An output settings display unit 601 displays a user interface as shown in FIG. 13 for making output settings for the output data of a print job (hereinafter referred to as "job data") that is transmitted to the printer 102 or 103. The output settings include, for example, the job name, the number of print copies, the output paper size, etc.

A job data generating unit 602 provides an instruction to display a user interface to the output settings display unit 601 in response to an instruction from a print instruction unit 604, and generates job data (FIG. 7, described later) that includes output settings information acquired from the output settings display unit 601.

Figure 11:
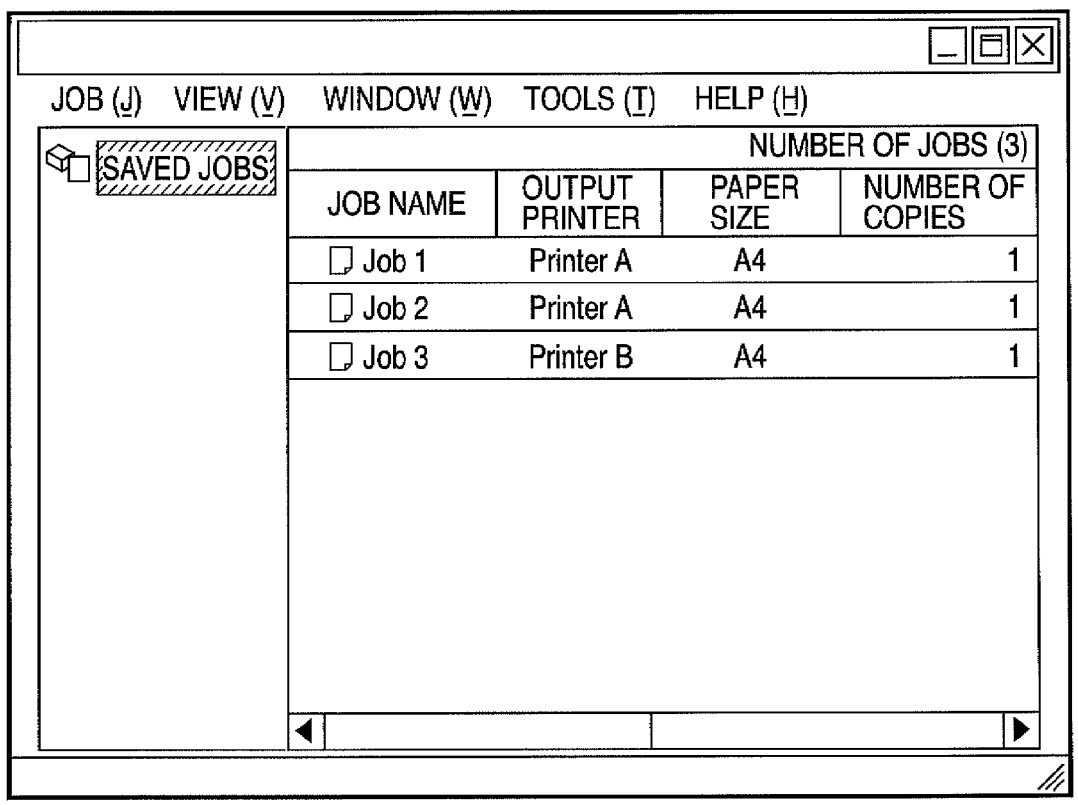
FIG. 11 is a diagram illustrating a user interface showing a job list displayed by an information processing system according to an embodiment of the present invention.

A job list display unit 603 displays a job list (FIG. 8, described later) that is managed by a job list management unit 606 on a user interface as shown in FIG. 11. The user can select job data from the job list displayed by the job list display unit 603 and provide a print instruction to the printer 102 or 103.

Upon receiving the print instruction from the job list display unit 603, the print instruction unit 604 transfers a transmission instruction to transmit the job data to the printer 102 or 103 to a communication unit 605. The print instruction unit 604 receives the job data from a job data management unit 607 and provides an instruction to generate job data to the job data generating unit 602.

The communication unit 605 transmits job data to the printer 102 or 103, or receives information from the printer 102 or 103 through the network 104. The information received from the printer includes, for example, the status of a print job. The communication unit 605 is provided with a receive buffer 6051 for receiving data from the printer 102 or 103 and temporarily storing the data.

Figures 7, 8:
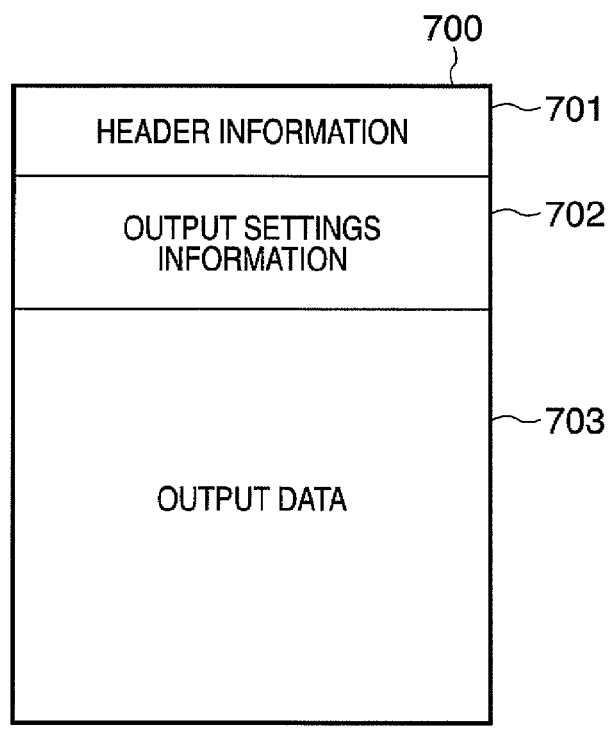
FIG. 7 is a diagram illustrating a job data format according to an embodiment of the present invention.
FIG. 8 is a diagram illustrating a format of a job list that is managed by an information processing system according to an embodiment of the present invention.

The job list management unit 606 generates and manages a job data list (as shown in FIG. 8, described later), which is stored in a job data storage unit 608.

The job data management unit 607 manages the job data stored in the job data storage unit 608. Specifically, the management includes processing such as saving job data in the job data storage unit 608, loading job data from the job data storage unit 608, and deleting job data. When additional job data is saved, or job data is deleted, the corresponding values of the items in the job list are also updated to reflect that change.

The job data storage unit 608 stores job data that can be printed by the printer 102 or 103, such as job data that has been transmitted to the printer 102 or 103, and job data that is to be transmitted to the printer 102 or 103.

Example of Job Data according to the Present Embodiment

FIG. 7 is a diagram illustrating a format of job data 700 that is generated by the job data generating unit 602 and is to be transmitted to the printer 102 or 103 in the information processing system of the present embodiment. Header information 701 includes information necessary to transmit job data to the printer 102 or 103, and information of the job data to be transmitted. Output settings information 702 includes output settings directed to the printer 102 or 103. The output settings include, for example, the number of print copies, the number of pages, the output paper size, etc. Output data 703 includes drawing information of output data that is drawn by the printer 102 or 103. Note that the job data 700 is not limited to the format shown in FIG. 7, and any format can be used as long as the output settings information and the drawing information of output data to be printed can be distinguished.

Example of Job List according to the Present Embodiment

FIG. 8 is a diagram illustrating a job list 800 that is generated by the job list management unit 606 based on information acquired from the job data management unit 607 in the information processing system of the present embodiment. Job ID 801 is identification information uniquely assigned by the job data generating unit 602 to identify a job in the information processing system. Job save location 802 includes information indicative of the location in which job data is saved (any one of the computer 101 and the printers A and B). Job name 803 is job identification information assigned to job data. The job name may be designated by the user, or may be the name of output data, for example. The job name is information utilized mainly when the user selects job data from a job list displayed by the job list display unit 603. Generated date/time 804 is date and time at which job data was generated in the job data generating unit 602.

Figure 9:
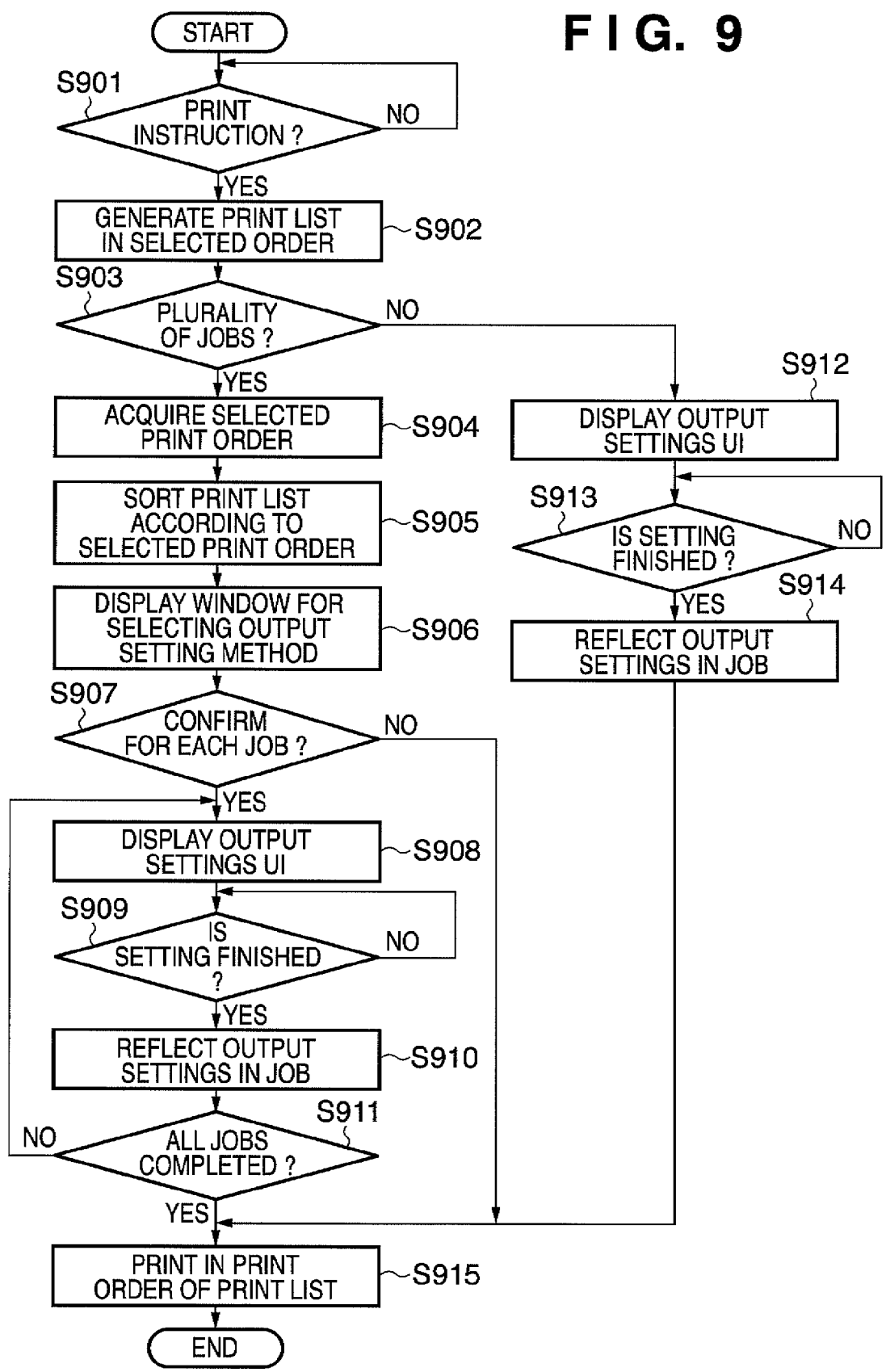
FIG. 9 is a flowchart illustrating a print execution process according to an embodiment of the present invention.

Process Sequence of Information Processing System according to the Present Embodiment FIG. 9 illustrates a process flow spanning from the reception of a print instruction to print job data from the user to the execution of printing by the printer 102 or 103 in the information processing system of the present embodiment. The program of the flow has been stored in the hard disk 205 of the computer 101, and is loaded into the RAM 202 and executed by the CPU 200. Here, it is mainly the modules of FIG. 6 that execute the process, but these modules are implemented by the execution of the program by the CPU 200, and thus it can be said that the process is executed by the CPU 200.

In step S901, the job list display unit 603 receives a print instruction from the user and determines whether or not it has received a print instruction. If the job list display unit 603 has received a print instruction, the process moves to step S902. The job list display unit 603 displays a list of executable job data items in a selectable manner based on the job list 800. The print instruction includes selecting job data to be printed from the displayed job data list and printing the selected job data. Herein, job data is data assigned to each print job, so that it is countable according to the number of print jobs. For example, a single job data item means output data assigned to a single print job. S901 of FIG. 9 corresponds to a print instruction receiving unit that receives an input of target print data from among print data saved in association with output settings and an input of a print instruction.

Figure 10:
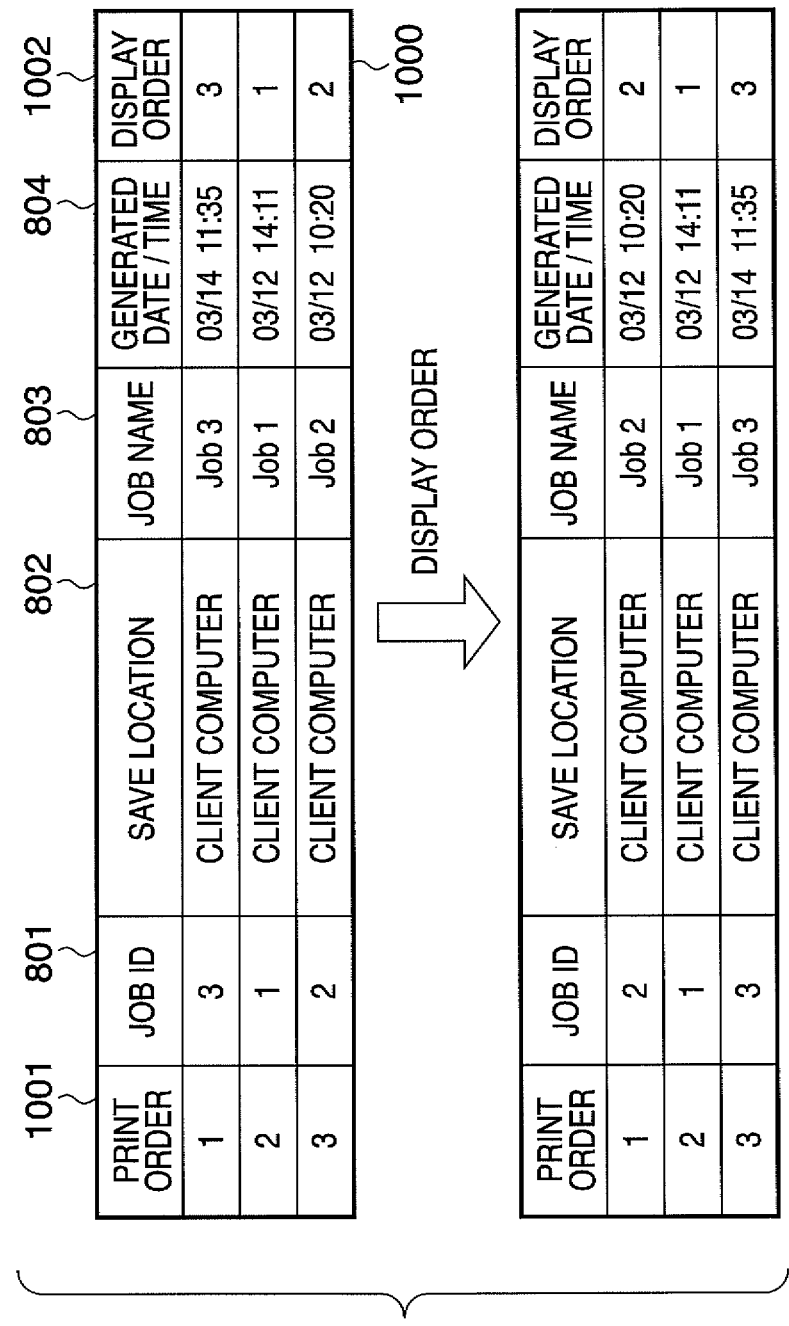
FIG. 10 is a diagram illustrating a format of a print list that is managed by an information processing system according to an embodiment of the present invention.

In step S902, the job list display unit 603 generates a print list 1000 as shown in FIG. 10 in which job data items are arranged in the order in which their print instructions were entered by the user. The example of FIG. 10 assumes that the print instructions were received in the order of Job 3, Job 1, and Job 2. The print list 1000 includes additional items, that is, print order 1001 and display order 1002, in addition to the items of the job list 800. The print order 1001 may be changed later, but is set to the selected order by default.

In step S903, the job list display unit 603 determines whether or not the number of job data items instructed to be printed is plural (two or more). In other words, the job list display unit 603 determines whether or not the number of print jobs is plural. If the number is determined to be plural, the process moves to step S904, whereas if the number is determined to be singular (one), the process moves to step S912.

Figure 14:
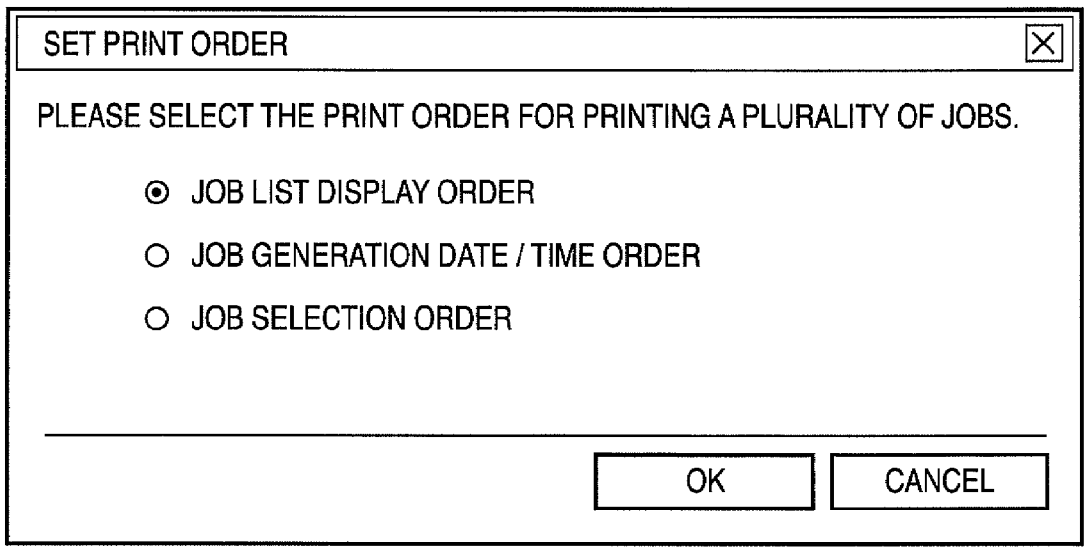
FIG. 14 is a diagram illustrating a user interface displayed when setting the print order of job data items in an information processing system according to an embodiment of the present invention.

In step S904, a print order of a plurality of jobs set by the user through a user interface as shown in FIG. 14 displayed by the job list display unit 603 is acquired. In this example, the print order can be set to a selected order, display order, or generated date/time order. The print order may be set in advance in a different manner.

In step S905, the job list display unit 603 sorts the print list 1000 based on the settings information of the print order acquired in step S904. In the case of the print order being set to the order of generating job data items, for example, the job data items are arranged in the order of Job 2, Job 1, and Job 3.

Figure 12:
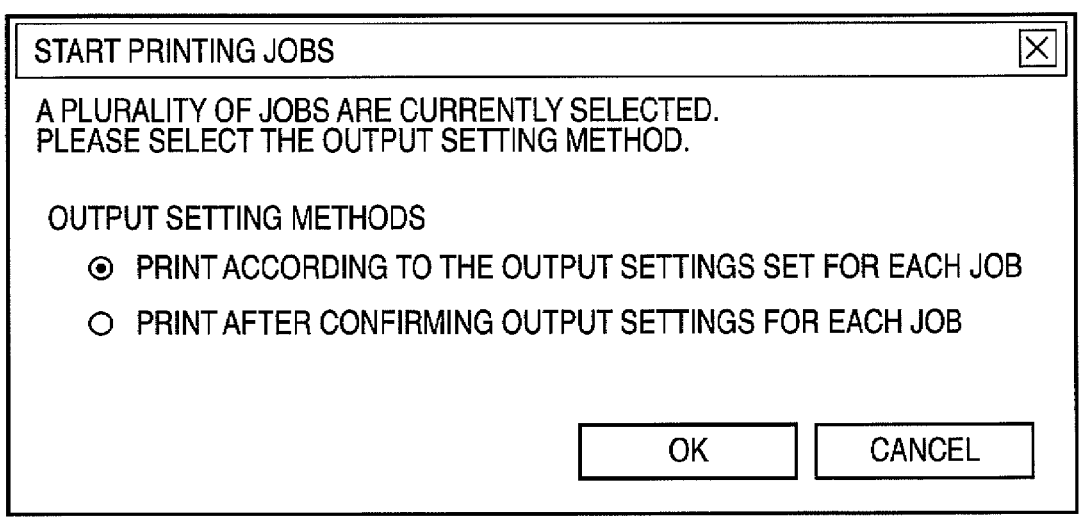
FIG. 12 is a diagram illustrating a user interface displayed when an information processing system according to an embodiment of the present invention executes the printing of a plurality of job data items.

In step S906, the job list display unit 603 displays a user interface, such as that shown in FIG. 12, though which an output setting method is selected.

In step S907, the output setting method selected in step S906 and the print list 1000 are transferred from the job list display unit 603 to the print instruction unit 604. The print instruction unit 604 determines whether the selected output setting method is "print according to the output settings set for each job" or "print after confirming output settings for each job". If "print after confirming output settings for each job" is selected, the process moves to step S908, whereas if "print according to the output settings set for each job" is selected, the process moves to step S915. This step S907 corresponds to a selection receiving unit that receives a selection of whether or not to confirm print settings when a plurality of print data items are selected to be printed by the above-mentioned print instruction receiving unit.

In step S908, the print instruction unit 604 acquires (i.e., loads) the job data items 700 stored in the job data storage unit 608, which correspond to the print jobs registered in the print list 1000, from the job data management unit 607, based on the print list 1000. The job data items 700 are transferred from the print instruction unit 604 to the job data generating unit 602. Upon receiving a display instruction from the job data generating unit 602, the output settings display unit 601 displays a user interface for making output settings, such as that shown in FIG. 13. The output settings displayed at this time are those saved in association with the job data item to be confirmed.

In step S909, the output settings display unit 601 determines whether or not the output setting is finished (i.e., whether or not the OK button has been pressed in FIG. 13). If the output setting is finished, the process moves to step S910.

In step S910, the output settings display unit 601 transfers the output settings information set by the user through the window of FIG. 13 or FIG. 31 to the job data generating unit 602. The job data generating unit 602 reflects the transferred output settings information in the job data item 700. The job data item 700 is then transferred from the job data generating unit 602 to the print instruction unit 604.

In step S911, the print instruction unit 604 determines whether or not the output setting is finished for all the job data items selected to be printed (Job 2, Job 1, and Job 3). If the output setting is finished for all the job data items, the process moves to step S915, whereas if the output setting is not finished for all the job data items, the process moves to step S908.

This loop process from step S908 to step S911 corresponds to a settings input unit. If a selection to confirm print settings for each job is made, the settings input unit receive an input of output settings for each print data item of a plurality of print data items to be output, and saves the received output settings as output settings associated with the print data item. In S908, the output settings associated with each print data item of a plurality of print data items are displayed, and a change can be made to the displayed output settings.

If the number of job data items instructed to be printed is one in step S903, in step S912, the print instruction unit 604 acquires a job data item 700 corresponding to that print job that has been registered in the print list 1000 from the job data management unit 607 based on the print list 1000. The job data item 700 is stored in the job data storage unit 608. The print instruction unit 604 transfers the job data item 700 to the job data generating unit 602. Upon receiving a display instruction from the job data generating unit 602, the output settings display unit 601 displays a user interface for making output settings as shown in FIG. 13.

In step S913, the output settings display unit 601 determines whether or not the output setting is finished (i.e., whether or not the OK button has been pressed in FIG. 13). If the output setting is finished, the process moves to step S914.

In step S914, the output settings display unit 601 transfers the output settings information set by the user in FIG. 13 to the job data generating unit 602. The job data generating unit 602 reflects the transferred output settings information in the job data item 700. After that, the job data item 700 is transferred from the job data generating unit 602 to the print instruction unit 604.

In step S915, the print instruction unit 604 transfers the job data item 700 to the communication unit 604. The communication unit 604 transfers the job data item to a designated printer, for example, the printer 102 or 103, and sends a print instruction. Step S915 corresponds to a transmission unit that transmits print data to be output and the output settings associated with the print data to a designated printer.

In steps S908 to S910, and steps S912 to S914, the job data 700 is directly transferred, but it is also possible to transfer job data and information that identifies the location of the job data, such as a job ID and storage location.

Example of Print List According to the Present Embodiment

FIG. 10 shows a diagram of an exemplary print list 1000 produced based on the job list 800 after the job list display unit 603 has received a print instruction in the information processing system according to the present embodiment. The print list 1000 is generated in the selected order of job data items. The print order 1001 indicates the order in which the job data items are printed. The job data items are transmitted in this order to the printer 102 or 103. The display order 1002 is the order in which the job data items are displayed in a job list displayed by the job list display unit 602. FIG. 10 shows an exemplary print list 1000 in which the selected order of job data items is the order of Job 3, Job 1 and Job 2, and an exemplary print list 1000 after being sorted in a job generation data/time order (the order of Job 2, Job 1, and Job 3) in step S905 of FIG. 9.

Job List User Interface according to the Present Embodiment

FIG. 11 is a diagram illustrating an example of a user interface displayed by the job list display unit 603 in the information processing system according to the present embodiment. The job list display unit 603 displays the job list 800 managed by the job list management unit 606 on a user interface, as shown in FIG. 11. The user selects a job data item from the displayed job list, and provides a print instruction. For example, the user provides a print instruction from the "print" menu of the "job" menu. The job data items selected by the user as well as the order that the job data items were selected are saved.

User Interface when Printing Plural Jobs According to the Present Embodiment FIG. 12 is a diagram illustrating an example of a user interface (designation window) displayed by the job list display unit 603 when the user has selected a plurality of job data items from the job list shown in FIG. 11, and provided a print instruction in the information processing system according to the present embodiment. If "print according to the output settings set for each job" is selected, printing is carried out according to the output settings information 702 of the job data 700 stored in the job data storage unit 608. If "print after confirming output settings for each job" is selected, each job is displayed on the user interface of FIG. 13 which shall be described below. "Print after confirming output settings for each job" has been described in the flowchart of FIG. 9.

User Interface for Output Settings According to the Present Embodiment

FIG. 13 is a diagram illustrating an example of a user interface (output settings window) displayed by the output settings display unit 601 of the information processing system of the present embodiment. The user designates a printer to use for output, the job name, the number of copies, etc. Further, pressing the Print Settings button displays a user interface as shown in FIG. 31 for making detailed output settings (print settings) such as output paper size and paper output destination.

User Interface for Print Settings According to the Present Embodiment

FIG. 31 is a diagram illustrating an example of a user interface (print settings window) displayed by the output settings display unit 601 of the information processing system of the present embodiment upon pressing the print settings button in FIG. 13. The user makes detailed settings regarding the processing of print data in the printer (output paper size, print orientation, page layout, paper feed unit, paper output destination, color settings etc.).

User Interface for Setting Print Order According to the Present Embodiment

FIG. 14 is a diagram illustrating an example of a user interface for designating a job print order (job execution order) displayed by the job list display unit 603 of the information processing system of the present embodiment. In the present embodiment, three options are shown as an example: "Job List Display Order", "Job Generation Date/Time Order" and "Job Selection Order", but other attributes, such as "Job Name Order", may be used as long as the print order can be specified thereby.

As described above, the present embodiment makes it possible to select whether to display a settings window for each individual job data item or carry out printing according to the existing output settings when an instruction to print a plurality of job data items is entered. Thereby, the user operability can be improved.

Embodiment 2

Embodiment 1 discloses the configuration in which the process flow is changed depending on whether there are plural jobs or a single job when printing the data saved in the computer 101. However, the present invention is also applicable when printing not only the job data saved in the computer 101, but also the job data saved in the printer 102 or 103, as a print target. The present invention is also applicable when printing a plurality of job data items saved in different locations, such as the computer 101 and the printer 102, 103 at a time. Hereinafter, an embodiment in which job data items saved in a plurality of locations are printed at a time shall be described in detail with reference to the accompanying drawings, focusing primarily on the differences from Embodiment 1.

Exemplary Software Configuration According to the Present Embodiment

Figure 15:
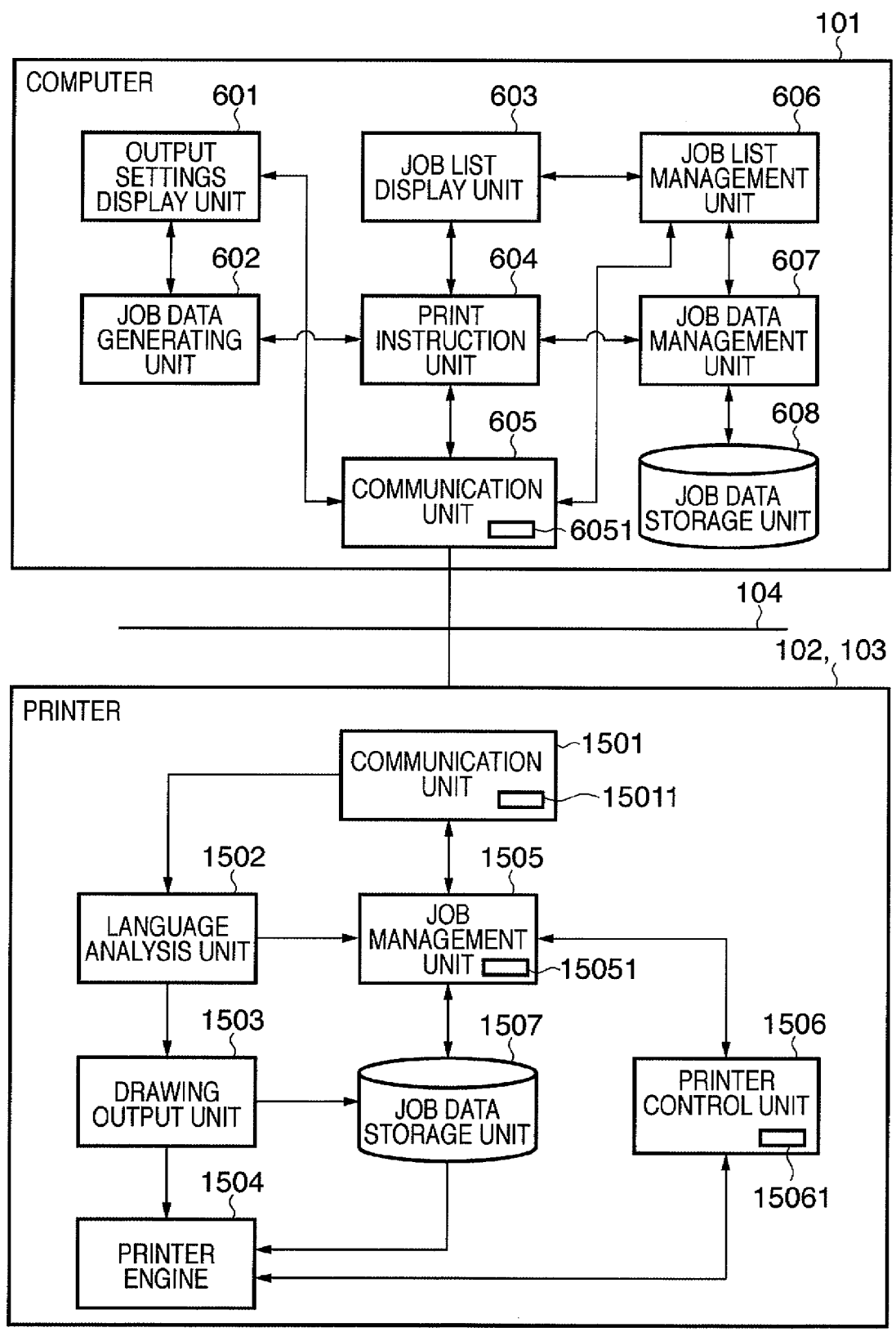
FIG. 15 is a diagram illustrating an example of a software configuration of an information processing system according to Embodiment 2 of the present invention.
Figure 22:
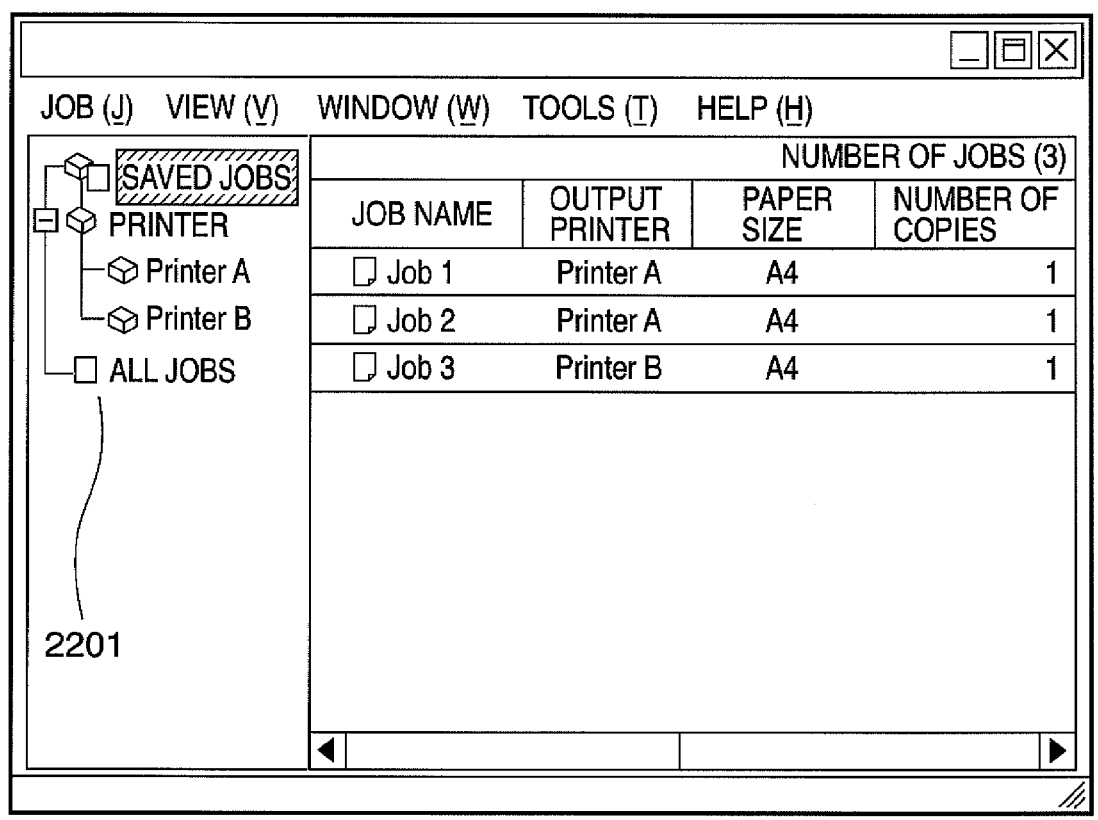
FIG. 22 is a diagram illustrating a job list user interface displayed by an information processing system according to Embodiment 2 of the present invention.

FIG. 15 is a diagram illustrating a configuration of the functional modules of an information processing system of the present embodiment. The configuration of the modules of a computer 101 is the same as those of Embodiment 1 (blocks 601 to 608 of FIG. 6). A job list management unit 606 of the present embodiment acquires the information of a job data storage unit 1507 of a printer 102 or 103 through a communication unit 605, and manages the information using a job list 800 as shown in FIG. 16. A job list display unit 603 displays the information of the job list 800 (a list of the job data items saved in the computer 101 and the printer 102 or 103) on a user interface as shown in FIG. 22. The print instruction unit 604 transmits a print command to print the job data of the job data storage unit 1507 of the printer 102 or 103 to the printer 102 or 103 through the communication unit 605. The job list 800 of the present embodiment includes an internal job ID 805 in addition to the items of the job list of Embodiment 1.

A communication unit 1501 of the printer 102 or 103 receives and manages job data and the attributes input by the computer 101. This communication unit 1501 is provided with a receive buffer 15011 for receiving data from the computer 101 and temporarily storing the data.

A language analysis unit 1502 thoroughly analyzes the content of the job data, and executes an associated control command, such as job management or drawing output, according to the command included in the content of the job data. In the present embodiment, the language analysis unit 1502 receives commands one by one from the receive buffer 15011 provided in the communication unit 1501, checks the content according to the description rules of the printer control language, and determines what kind of process is required by the command. If the command is found to be a command regarding jobs such as to start a print job, or to declare to end a job, or if the command is found to be a command regarding job attributes such as paper size, the number of sheets and stapling, the language analysis unit 1502 issues a command to manage the corresponding job to a job management unit 1505. If the command is a command regarding drawings such as characters, graphics and images, the language analysis unit 1502 issues an instruction to output the corresponding drawing to a drawing output unit 1503.

The drawing output unit 1503 develops drawings to be output to a printer, such as characters, graphics or images, and outputs the resultant. In the present embodiment, the drawing output unit 1503 produces the corresponding character patterns, calculates graphics, or develops image data according to an instruction to output the drawings from the language analysis unit 1502 so as to develop them into an output data format, and transmits them to a printer engine 1504. If the command from the computer 101 is not a print command but a save command, the processed job data is saved in the storage unit 1507.

The printer engine 1504 is an apparatus such as a laser beam printer engine, and performs the actual print output process using a mechanism such as electrophotography according to the developed output data received from the drawing output unit 1503. The printer engine 1504 includes a unit for detecting the amount of remaining recording paper, so that if paper is not loaded, the printer engine 1504 continuously sends an alarm signal to a printer control unit 1506. If paper runs out during the development/printing process, the printer engine 1504 causes a recording unit such as a printer drum to stop, and sends an error message to the printer control unit 1506 by means of interruption or the like.

The job management unit 1505 schedules and manages the attributes of the job sent from the computer 101 on a job-by-job basis according to the job management command from the language analysis unit 1502. The job management unit 1505 also manages the job data stored in the job data storage unit 1507. The job management unit 1505 holds a job management table 1700, such as that shown in FIG. 17, in a job information management memory 15051 provided in the job management unit 1505, and performs control on a on a job-by-job basis. The job information in the job management table 1700 is initialized/produced by a job start command, and is determined by a job end command. Regardless of whether or not it has received a job end command, the job management unit 1505 can also change attributes or the priority order of the schedule (print order), or can cancel a print job by the job data that follow or an instruction from the computer 101. Further, the job management unit 1505 can issue an instruction to print the job data stored in the job data storage unit, and cancel the print instruction. The job management unit 1505 issues a selection command of paper or a paper output unit to use according to the attributes of the job executed to the printer control unit 1506. Also, the job management unit 1505 continuously monitors the status of the job being executed and the job data stored in the job data storage unit 1507 by acquiring the state of the printer apparatus through the printer control unit 1506, and generates a notification status where necessary such as when an error occurs.

The printer control unit 1506 selects, for example, paper to use according to the control command of the printer apparatus from the job management unit 1505, or performs control of the printer apparatus such as initializing the printer apparatus. The printer control unit 1506 continuously monitors the state of the entire printer apparatus, such as the state of paper feed cassettes, whether a door is open or closed, and whether or not the toner has run out, and issues a notification regarding the state of the printer apparatus to other components when necessary. The latest state of the printer apparatus, such as the amount of remaining paper or error conditions, is saved in a printer information management memory 15061 provided in the printer control unit 1506.

The job data storage unit 1507 saves the job data that has been received from the computer 101 having undergone the process of the drawing output unit 1503, and performs control (e.g., printing process) of the saved job data according to an instruction from the computer 101 or the printer 102 or 103 itself.

By saving the job data that has undergone the process performed by the drawing output unit 1503 as described above, the time required for a printing operation can be shortened when the job data is printed repeatedly. In other words, it is possible to omit the process of receiving/transmitting job data and the attributes from/to the computer 101, the printer 102 or 103, the process of the language analysis unit 1502 and the drawing output unit 1503, and the like from the second instance of printing on.

It should be noted that the present invention is applicable to a configuration in which some or all of the components of the printer 102 or 103, or part of the functions thereof, are provided in other computers such as the computer 101 without departing from the scope of the present invention.

Example of Job List According to the Present Embodiment

FIG. 16 is a diagram illustrating a job list 800 managed by the job list management unit 606 of the computer 101 in an information system of the present embodiment. The job list 800 stores, in addition to the information of FIG. 8, the information of the job data stored in the job data storage unit 1507 of the printers 102 and 103. Internal job IDs 805 that are assigned uniquely to the job data items of the printers 102 and 103 are also stored in the job list 800. The internal job IDs 805 are used by the computer 101 to perform control (e.g., print instruction) of the job data stored in the job data storage unit 1507.

Example of Job Management Table According to the Present Embodiment

FIG. 17 is a diagram illustrating a job management table 1700 held by the job information management memory 15051 of the printer 102, 103 in the information system of the present embodiment. Serial number 1701 is the number assigned to each job data item received by the printer 102. Internal job ID 1702, job name 1703, and generated date/time 1704 are the same as the internal job ID, the job name, the generated date/time of the job list 800. In job attributes 1705, output information such the number of copies and the number of pages is stored as the attributes of job data.

Figure 18:
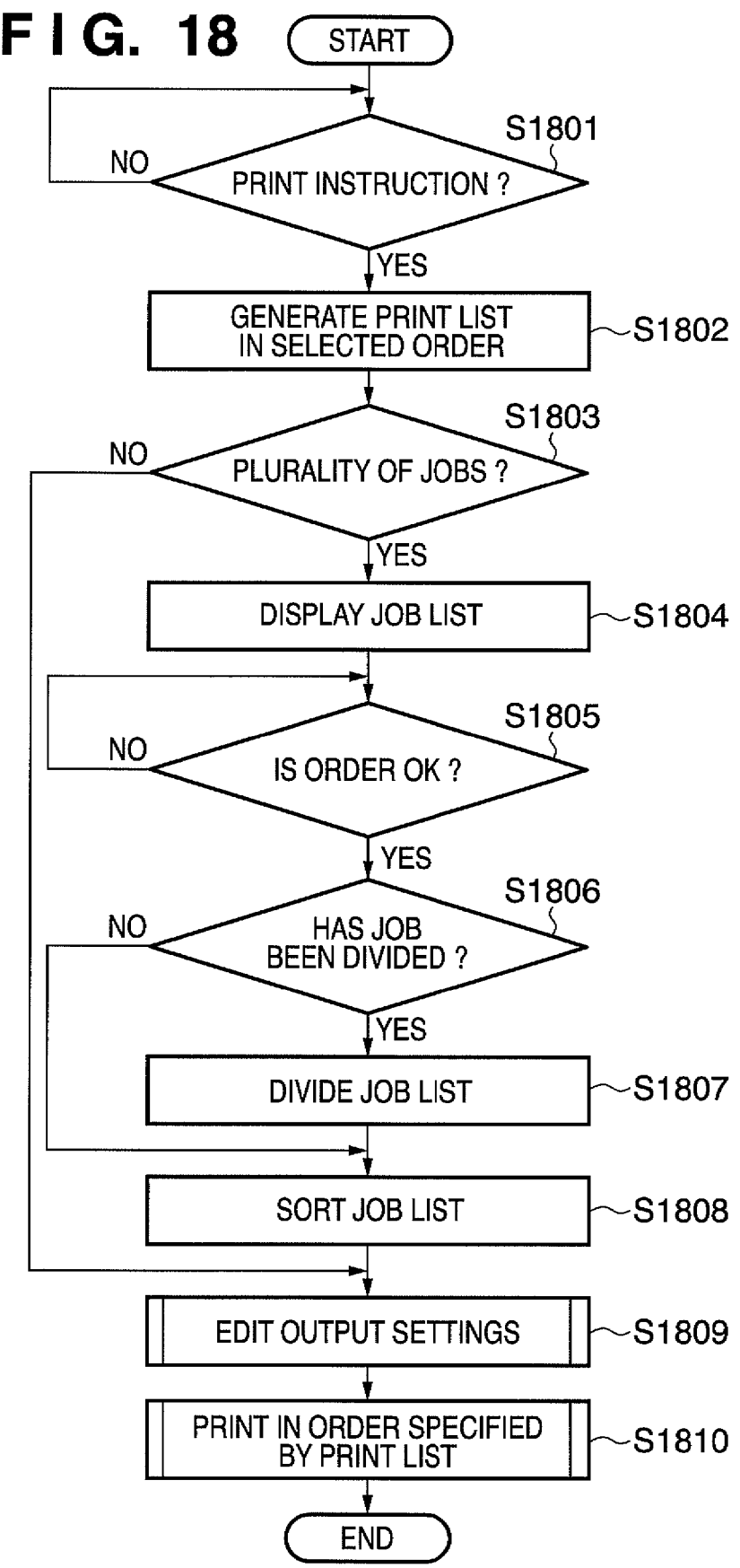
FIG. 18 is a flowchart illustrating a print execution process according to Embodiment 2 of the present invention.

Process Sequence of Information Processing System According to the Present Embodiment FIG. 18 illustrates a process flow spanning from the reception of a print instruction to print job data from the user to the execution of printing by the printer 102 or 103 in the information processing system according to the present embodiment. The program of the flow has been stored in the hard disk 205 of the computer 101, and is loaded into the RAM 202 and executed by the CPU 200.

In step S1801, the job list display unit 603 determines whether or not a print instruction has been received from the user. If a print instruction has been received, the process moves to step S1802.

Figure 21:
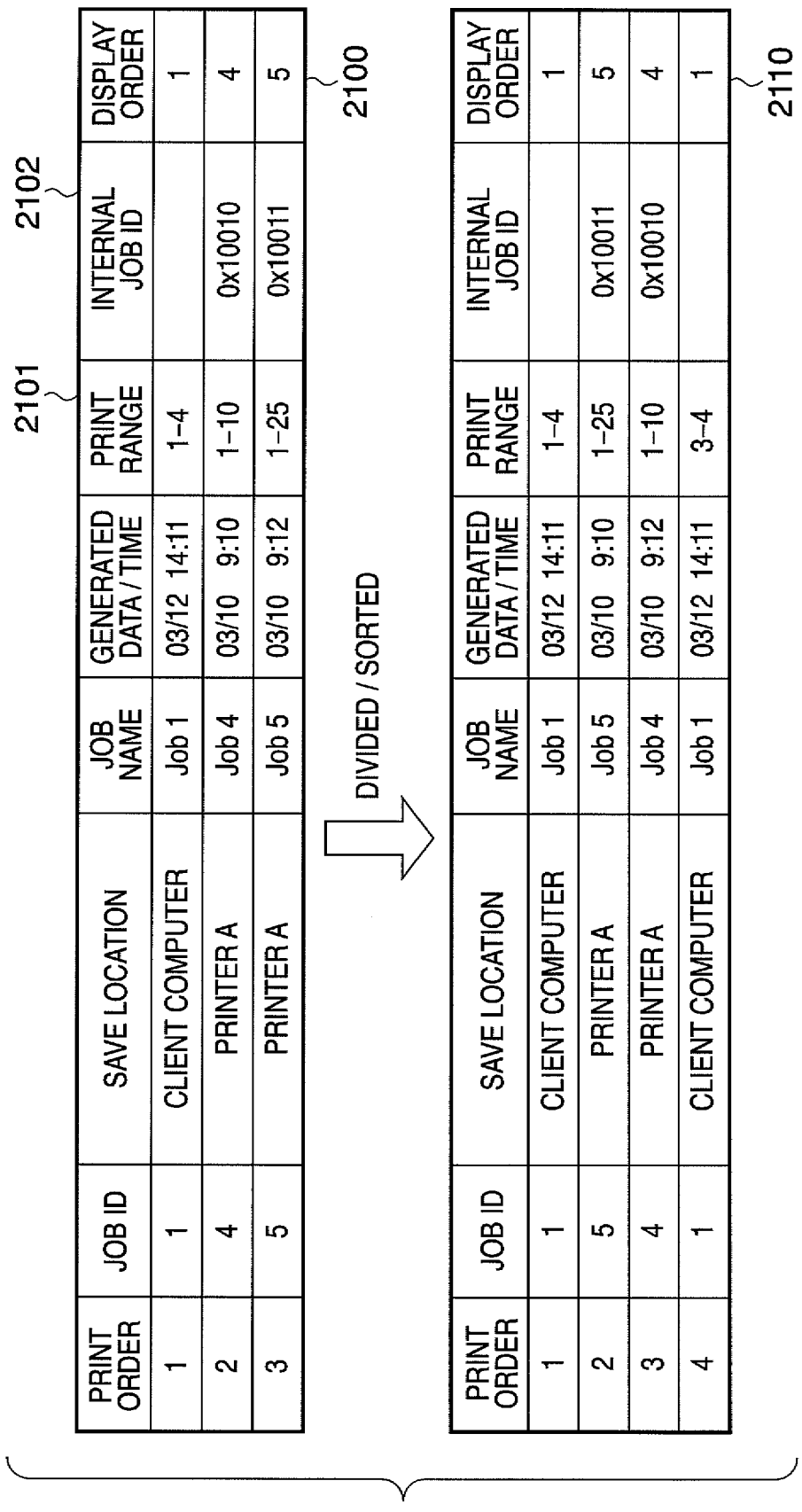
FIG. 21 shows diagrams illustrating the formats of a print list that is managed by an information processing system according to Embodiment 2 of the present invention.

In step S1802, the job list display unit 603 generates a print list 2100 shown in FIG. 21 in which the job data items instructed to be printed are listed in the order that the user selected (in this case, Job 1, Job 4, and Job 5 are selected, in this order).

In step S1803, it is determined whether or not the number of job data items instructed to be printed is plural (two or more). If the number is determined to be plural, the process moves to step S1804, whereas if the number is determined to be singular (one), the process moves to step S1809.

In step S1804, the job list display unit 603 displays a user interface, such as that shown in FIG. 23, for setting a print order. With the user interface of FIG. 23, the order of job data items can be changed, and an instruction to divide a job data item is entered.

In step S1805, it is determined whether or not the print order setting is finished in FIG. 23 (whether or not the OK button has been pressed). If the print order setting is finished, the process moves to step S1806.

In step S1806, it is determined whether or not a single job data item has been divided into a plurality of parts as a result of the setting of step S1805 (e.g., Job 1 of FIG. 23). If the job data item is divided, the process moves to step S1807. If not, the process moves to step S1808.

In step S1807, the job data item in the print list 2100 is divided according to the settings of FIG. 23 (the record of the print list 2100 is copied, and the print range is edited).

In step S1808, in the print list 2100, the job data items are sorted according to the settings of FIG. 23 (as shown in the lower portion of FIG. 21).

In step S1809, a process of editing the output settings of the job data (the flowchart of FIG. 19) is performed.

Figure 20:
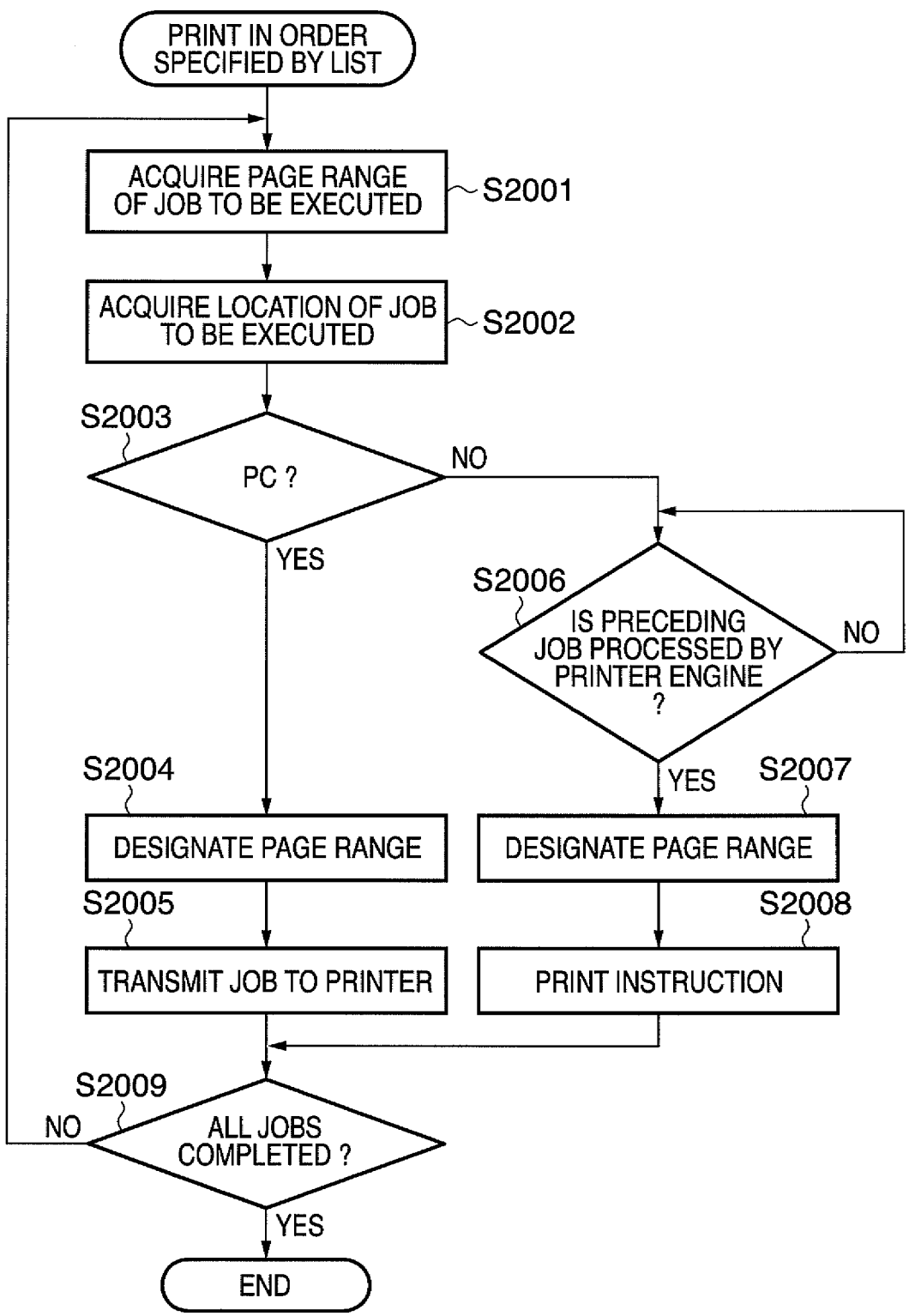
FIG. 20 is a flowchart illustrating the process of executing a printing operation of FIG. 18.

In step S1810, printing is executed in the order specified by the print list (according to the flowchart of FIG. 20).

"Edit Output Settings" Process Sequence according to the Present Embodiment

Figure 19:
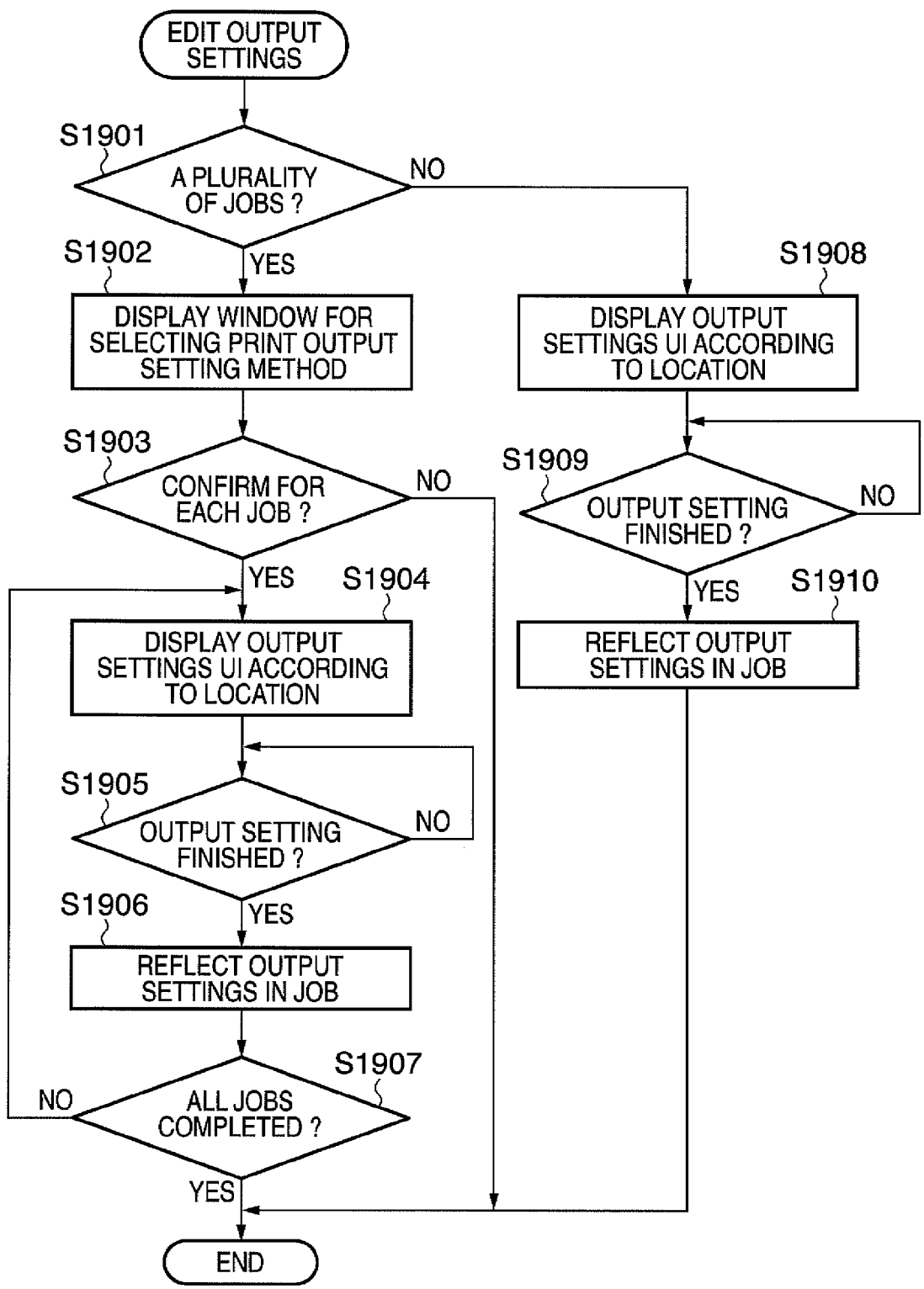
FIG. 19 is a flowchart illustrating the process executed when editing output settings of FIG. 18.

FIG. 19 illustrates a flow of a process (step S1809 of FIG. 18) of editing the output settings of job data to be printed in the information processing system according to the present embodiment. The program of the flow has been stored in the hard disk 205 of the computer 101, and is loaded into the RAM 202 and executed by the CPU 200.

In step S1901, it is determined whether or not the number of job data items instructed to be printed is plural (two or more). If the number is determined to be plural, the process moves to step S1902, whereas if the number is determined to be singular (one), the process moves to step S1908.

In step S1902, the job list display unit 603 displays a user interface as shown in FIG. 12.

In step S1903, the result of the selection in step S1902 and a print list 2100 are transferred from the job list display unit 603 to the print instruction unit 604. The print instruction unit 604 determines whether the result of the selection is "print according to the output settings set for each job" or "print after confirming output settings for each job". If the result is "print after confirming output settings for each job", the process moves to step S1904. If the result is "print according to the output settings set for each job", the "Edit Output Settings" process ends.

In step S1904, if the "Save Location" in the print list 2100 is the computer 101, the print instruction unit 604 acquires the job data 700 stored in the job data storage unit 608 from the job data management unit 607. The job data 700 is transferred from the print instruction unit 604 to the job data generating unit 602, and the output settings display unit 601 displays a user interface such as that shown in FIG. 13. If the "Save Location" in the print list 2100 is the printer A or the printer B, the output settings display unit 601 acquires the output settings information of the job data saved in the job data storage unit 1507 from the printer A or the printer B. The output settings information display unit 601 displays the acquired output settings information on a user interface as shown in FIG. 24. The reason why the window is changed depending on the save location as described above is because the output settings that can be set are different depending on the save location of the job data (the reason why the output settings that can be set are different shall be described later).

In step S1905, the output settings display unit 601 determines whether or not the output setting is finished (whether or not the OK button has been pressed in FIG. 13 or 24). If the output setting is finished (if the OK button has been pressed), the process moves to step S1906.

In step S1906, if the location in which the job data is saved is the computer 101, the output settings display unit 601 transfers the output settings information inputted by the user in FIG. 13 to the job data generating unit 602, which in turn reflects the settings in the job data 700. After that, the job data generating unit 602 transfers the job data 700 to the print instruction unit 604. If the save location is the printer A or the printer B, the output settings information inputted by the user is transferred to the print instruction unit 604.

In step S1907, the print instruction unit 604 determines whether or not the output setting is finished for all the job data items. If the output setting is finished for all the job data items, the "Edit Output Settings" process ends. If not, the process moves to step S1904.

In step S1908, if the location in which the job data instructed to be printed is saved in the computer 101, the print instruction unit 604 acquires the job data 700 stored in the job data storage unit 608 from the job data management unit 607. The job data 700 is transferred from the print instruction unit 604 to the job data generating unit 602, and the output settings display unit 601 displays a user interface such as that shown in FIG. 13. If the save location is the printer A or the printer B, the output settings display unit 601 acquires the output settings information of the job data saved in the job data storage unit 1507 from the printer A or the printer B. The output settings information display unit 601 displays the acquired output settings information on a user interface as shown in FIG. 24. The reason why the window is changed depending on the save location as described above is because the output settings that can be set are different depending on the save location of the job data (the reason why the output settings that can be set are different shall be described later).

In step S1909, the output settings display unit 601 determines whether or not the output setting is finished (whether or not the OK button has been pressed in FIG. 13 or 24). If the output setting is finished (if the OK button has been pressed), the process moves to step S1910.

In step S1910, the output settings display unit 601 transfers the output settings information input by the user in FIG. 13 to the job data generating unit 602. The job data generating unit 602 reflects it in the job data 700. After that, the job data generating unit 602 transfers the job data 700 to the print instruction unit 604. If the save location is the printer A or the printer B, the output settings information input by the user is transferred to the print instruction unit 604.

In steps S1904 to S1906, and steps S1908 to S1910, the job data 700 is directly transferred, but only information such as job ID and storage location may be transferred.

"Print In List Order" Process Sequence according to the Present Embodiment

FIG. 20 illustrates a flow of a process (step S1810 of FIG. 18) of execute printing in the order specified by the print list 2100 in the information processing system according to the present embodiment. The program of the flow has been stored in the hard disk 205 of the computer 101, and is loaded into the RAM 202 and executed by the CPU 200.

In step S2001, the print instruction unit 604 acquires information regarding the print range of the job data to be printed from the print list 2100. In step S2002, the print instruction unit 604 acquires information regarding the save location of the job data to be printed from the print list 2100.

In step S2003, is it determined whether or not the location acquired in step S2002 is the computer 101. If the location is the computer 101, the process moves to step S2004, whereas if the location is not the computer 101 (i.e., the printer A or the printer B), the process moves to step S2006.

In step S2004, the print instruction unit 604 reflects the print rage acquired in step S2001 in the output settings information of the job data 700. In step S2005, the print instruction unit 604 transfers the job data 700 to the printer A or the printer B.

In step S2006, it is determined whether or not the printer engine 1504 has started processing a job data item immediately preceding a job data item to be executed now in the print order of the print list 2100. If it has started processing, the process moves to step S2007.

In steps S2007 and S2008, the print instruction unit 604 designates the print range acquired in step S2001, and transmits an instruction to execute printing to the printer A or the printer B. In the printer A or the printer B, when an instruction from the job management unit 1505 is received, the printing of the job data saved in the job data storage unit 1507 is executed by the printer engine 1504.

In step S2009, it is determined whether or not all the job data items have been executed. If all the job data items have been executed, the "Print in List Order" process ends. If not, the process moves to step S2001.

With the foregoing procedure, the information processing apparatus of the present embodiment can designate the print data saved in the information processing apparatus itself, an external device such as a printer, or both, as well as the output settings, and execute printing. It is also possible to select a plurality of print data items as a print target. When a plurality of print data items are selected, the information processing apparatus of the present embodiment allows the user to select whether to make output settings for each individual print data item.

Example of Print List according to the Present Embodiment

FIG. 21 shows a print list 2100 that is produced by the job list display unit 603 in response to a print instruction in the information processing system according to the present embodiment. The print list 2100 records, in addition to the information of the print list 1000, information 2101 indicative of the print page range, as well as internal job ID 2102.

FIG. 21 shows a print list when the selected order of job data items is Job 1, Job 4, and Job5, and a print list 2110 obtained after the division and sorting of job data items is performed in the print order set in step S1805 (FIG. 23) of FIG. 18.

Example of Job List according to the Present Embodiment

FIG. 22 is a diagram illustrating an example of a user interface displayed by the job list display unit 603 in the information processing system according to the present embodiment. The job list display unit 603 displays the job list 800 managed by the job list management unit 606 on a user interface as shown in FIG. 22. In FIG. 22, the type of job data to be displayed is switched by selecting a node from the tree displayed in a tree-structured display unit 2201. If a "Saved Job" node is selected, the job data items of the computer 101 are displayed. If the node of a printer is selected, the job data items of the printer A or the printer B are displayed. If an "All Jobs" node is selected, the job data items of the computer 101 and the printers A and B are displayed. The user selects job data from the job list and gives an instruction to print the job data (e.g., from the "print" menu of the "job" menu).

User Interface for Setting Print Order according to the Present Embodiment

FIG. 23 is a diagram illustrating an example of a user interface for setting a job data print order displayed by the job list display unit 603 of the information processing system of the present embodiment. A list (print list 2100) of the job data items instructed to be printed in FIG. 22 is displayed, whereby the user can copy (divide) a job data item, edit the print range (by using a user interface that is not shown), delete a job data item from the print list, change the order, or the like.

User Interface for Output Settings According to the Present Embodiment

FIG. 24 is a diagram illustrating an example of a user interface displayed by the output settings display unit 601 of the information processing system of the present embodiment when a job data item instructed to be printed is the one saved in the printer 102 or 103. Unlike FIG. 13, because the printer name and the job name are already determined, these items are excluded. By pressing the "Print Settings" button, a user interface as shown in FIG. 32 appears, so that detailed output settings (print settings) can be made such as output paper size and paper output destination.

User Interface for Print Settings According to the Present Embodiment

FIG. 32 is a diagram illustrating an example of a user interface (print settings window) displayed by the output settings display unit 601 of the information processing system of the present embodiment when the Print Settings button is pressed in FIG. 24. The user makes detailed settings regarding the processing of print data by the printer (output paper size, paper feed unit, paper output destination, color settings, etc.). In this window, it is assumed that print settings are made for a job data item saved in the job data storage unit 1507. In other words, the print settings are for a job data item having undergone the drawing process of the drawing output unit 1503, so that the items that can be set here are limited as compared to those of FIG. 31. Accordingly, the items having been processed in the drawing output unit 1503 or the like cannot be set (e.g., page layout).

As described above, the present embodiment is configured such that when an instruction to print a plurality of job data items saved in a plurality of locations is input, a method of designating the output settings can be selected, and the order print can be kept even when the locations are different. With this configuration, it is possible to improve user operability when processing a plurality of job data items of a plurality of locations.

Embodiment 3

Embodiment 2 discloses a method for collectively printing job data items saved in a plurality of locations such as the computer 101 and the printers 102 and 103 by selecting them from a list of the job data items saved in the plurality of locations. According to Embodiment 3, a single job data item is divided into a plurality of parts, and the parts are saved in a plurality of locations. The saved jobs into which the single job data item have been divided are printed collectively in an efficient manner while maintaining the page order.

The present embodiment is performed by the following workflow, for example. In a single job data item, page data that can be made public to other users is saved in the printer 102 or 103, whereas confidential page data that is not to be made public to other users is saved in the computer 101. When printing, the job data items saved in different locations are printed collectively. The process of the information processing system of the present embodiment shall be described in detail below with reference to the accompanying drawings, focusing primarily on the differences from Embodiment 2.

Figure 25A:
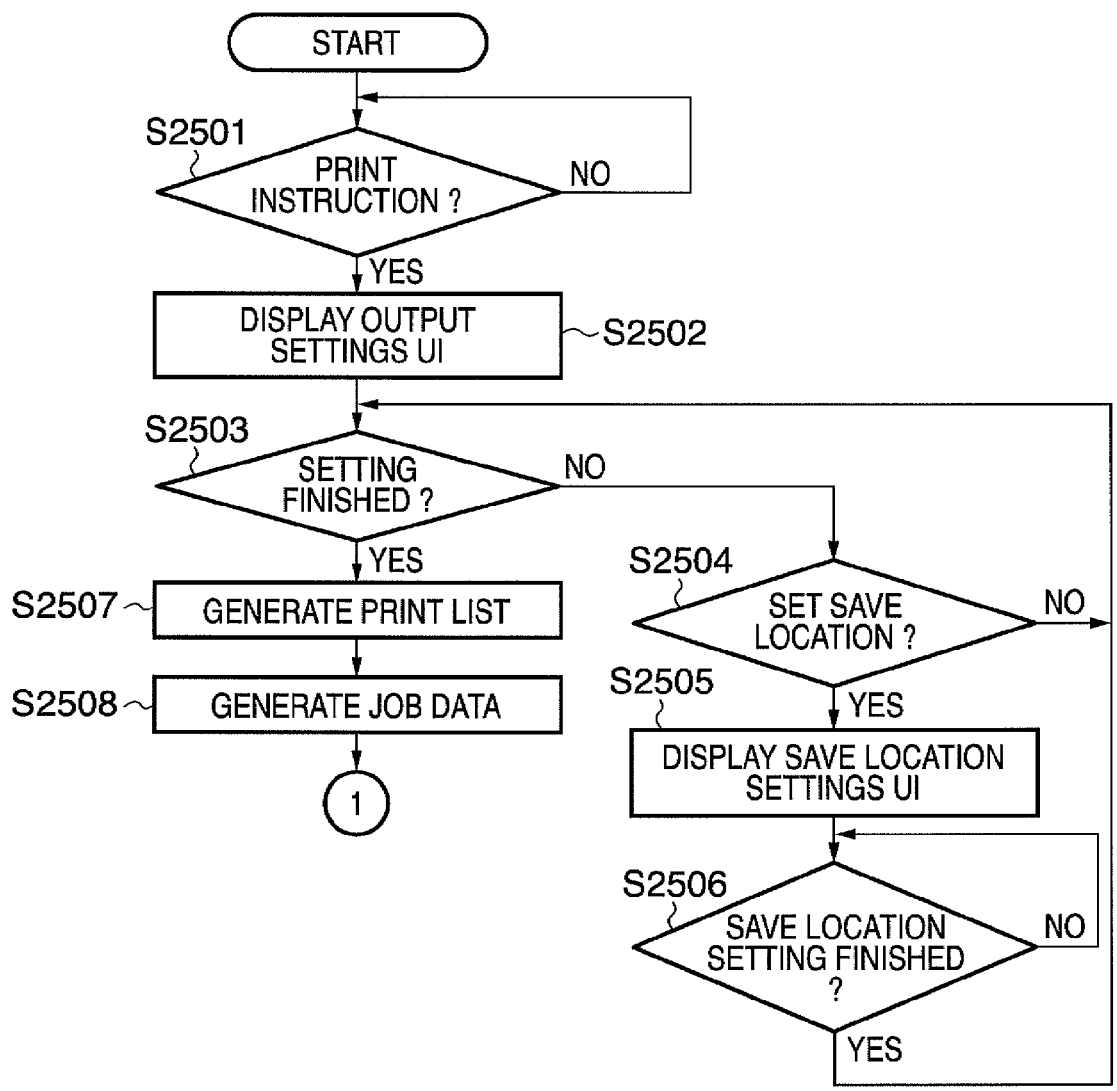
FIGS. 25A and 25B are flowcharts illustrating a printing or saving process according to Embodiment 3 of the present invention.
Figure 25B:
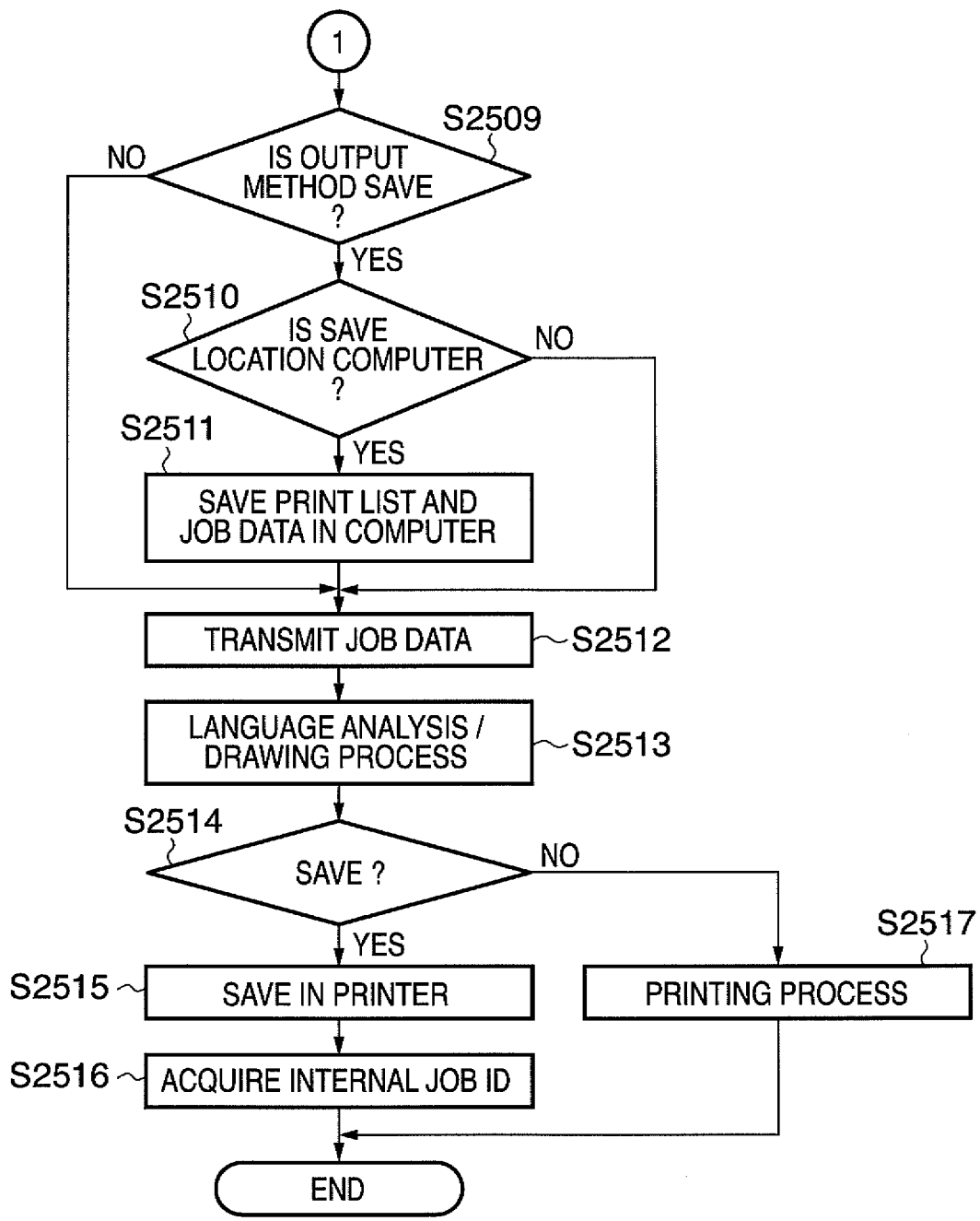

Process Sequence of The Information Processing System according to the Present Embodiment FIGS. 25A and 25B illustrate flows spanning from the reception of a print instruction or save instruction from the user to the execution of printing or saving process by the printer 102 or 103 in the information processing system according to the present embodiment.

The program of the flow has been stored in the hard disk 205 of the computer 101, and is loaded into the RAM 202 and executed by the CPU 200. Note that part of the flow is executed by the CPU of the printer 102 or 103 after the program stored in the hard disk (not shown) of the printer 102 or 103 is loaded into the RAM.

In step S2501, the job list display unit 603 receives a print instruction from the user, and determines whether or not a print instruction has been received (e.g., a print instruction is made by selecting "execute printing" menu (not shown) of the "job" menu of FIG. 22). If a print instruction has been received, the process moves to step S2502. In step S2502, the output settings display unit 601 displays a user interface such as that shown in FIG. 29.

Figure 29:
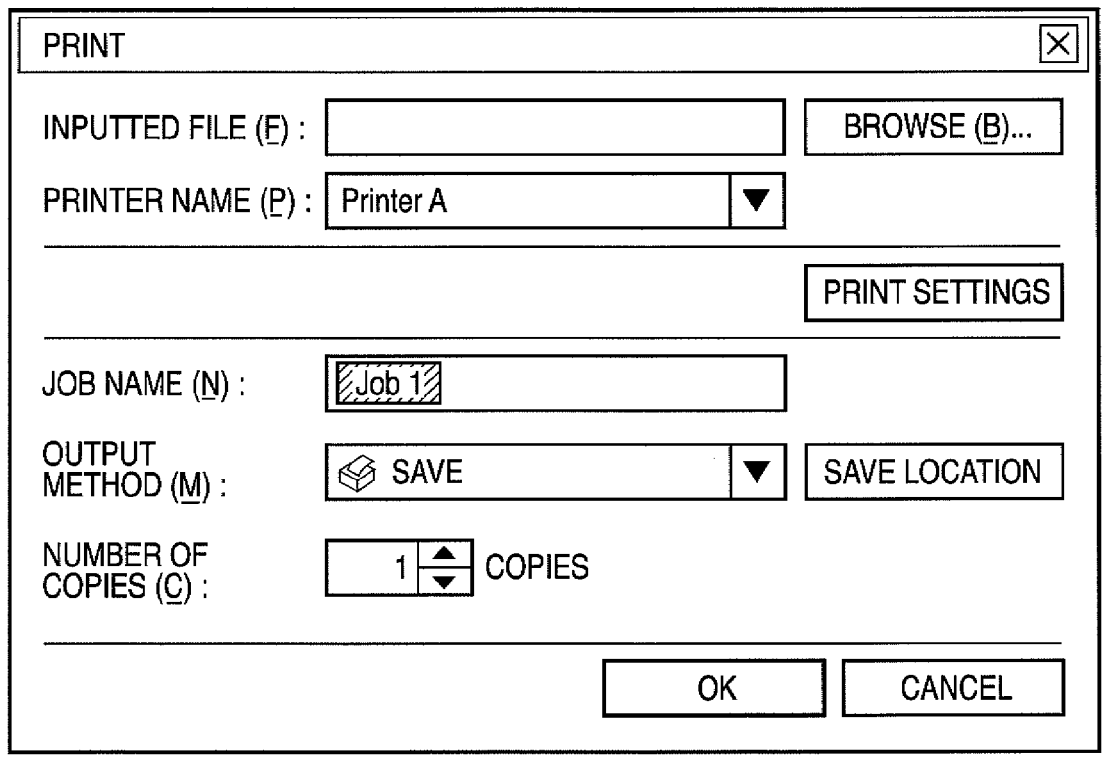
FIG. 29 is a diagram illustrating a user interface displayed when making output settings in an information processing system according to Embodiment 3 of the present invention.

In step S2503, it is determined whether or not the output setting is finished (i.e., whether or not the OK button has been pressed in FIG. 29). If the output setting is finished, the process moves to step S2507, whereas if the output setting is not finished, the process moves to step S2504.

In step S2504, it is determined that whether the "Save Location" button has been pressed in FIG. 29. If the "Save Location" button has been pressed, the process moves to step S2505. If the "Save Location" button has not been pressed, the process moves to step S2503.

Figures 30A, 30B, 30C:
FIGS. 30A to 30C are diagrams illustrating user interfaces displayed when setting job data save location in an information processing system according to Embodiment 3 of the present invention.

In step S2505, the output settings display unit 601 displays a user interface for setting a save location such as that shown in FIG. 30A, and save location settings are made.

In step S2506, it is determined whether or not the save location setting is finished (i.e., whether the "OK" button or the "Cancel" button is pressed in FIG. 30A). If the setting is finished, the process moves to step S2503.

In step S2507, the job list display unit 603 generates a print list 2700 shown in FIG. 27 according to the settings set in FIG. 29. In step S2508, the job data generating unit 602 generates job data 700 according to the settings set in FIG. 29. When saving single job data item in a plurality of locations, the number of job data items generated is a number equal to the number of locations (a print range is defined in output settings information 702, and output data 703 is generated using only the page data included in the print range). The job ID is set in the header information of the job data 700, and information regarding the output method (print or save, etc.) is set in the output settings information 702.

In step S2509, the print instruction unit 604 determines whether or not the output method of the header information 701 of the job data 700 is "Save". If the output method is "Save", the process moves to step S2510. If the output method is "Save" (i.e., "Print"), the process moves to step S2512.

In step S2510, it is determined whether or not the "Save Location" of the print list 2700 is set to the computer 101. If the "Save Location" is set to the computer 101, the process moves to step S2511. If the "Save Location" is set to not the computer 101, the process moves to step S2512.

In step S2511, the print list 2700 and the job data 700 that sets the "Save Location" of the print list 2700 to "Client Computer" are saved in the job data storage unit 608. In step S2512, the job data that sets the "Save Location" of the print list 2700 to "Printer A" or "Printer B" is transmitted to the printer A or the printer B.

In step S2513, the language analysis unit 1502 and the drawing output unit 1503 of the printer perform the language analysis process and the drawing output process, respectively.

In step S2514, it is determined whether or not the output method of the output settings information 702 of the job data 700 is "Save". If the output method is "Save", the process moves to step S2515. If the output method is not "Save", but "Print", the process moves to step S2517.

In step S2515, the job data is saved in the job data storage unit 1507 of the printer. In step S2516, the job management unit 1505 communicates the job ID of the job data saved in step S2515 and the internal job ID to the client computer 101. Upon receiving the communication, the client computer 101 sets the internal job ID in the print list 2700 if a job having the corresponding job ID is found in the print list 2700 saved in step S2510. The internal job ID communicated here is used in the printing process of FIG. 26. In step S2517, the printer engine 1504 of the printer executes a printing process.

Figure 26:
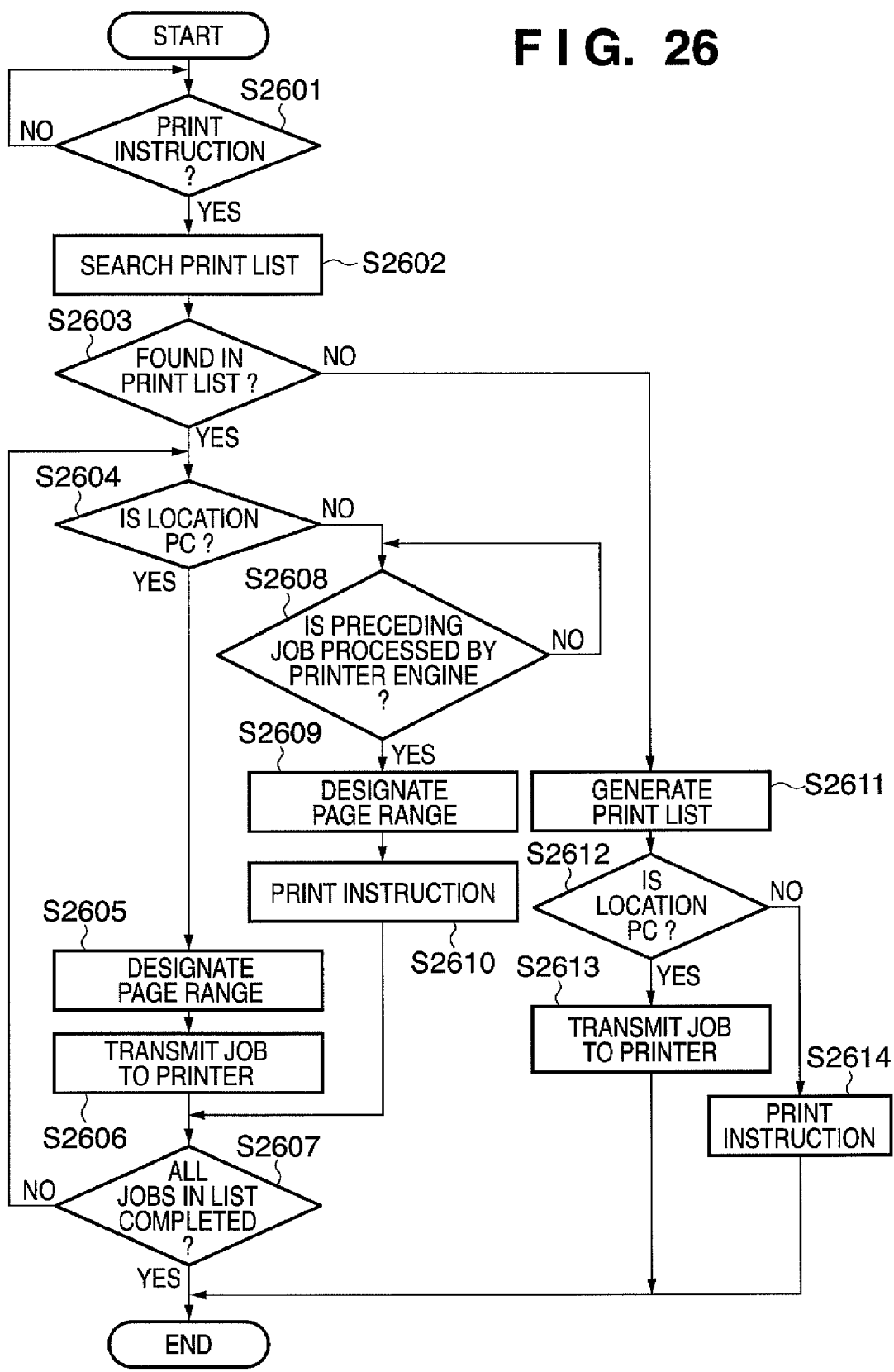
FIG. 26 is a flowchart illustrating a printing process of saved job data according to Embodiment 3 of the present invention.

Process Sequence of the Information Processing System according to the Present Embodiment FIG. 26 illustrates a flow spanning from the reception of a print instruction to print job data saved in the sequence of FIGS. 25A and 25B from the user to the execution of printing by the printer 102 or 103 in the information processing system of the present embodiment. The program of the flow has been stored in the hard disk 205 of the computer 101, and is loaded into the RAM 202 and executed by the CPU 200.

In step S2601, the job list display unit 603 determines whether or not a print instruction has been received from the user. If a print instruction has been received, the process moves to step S2602. In step S2602, a search is made for job data instructed to be printed in the print list 2700 saved in the job data storage unit 608 (based on the job ID). In step S2603, it is determined from the result of the search in step S2602 whether such job data is found in the print list 2700. If found, the process moves to step S2604. If not found, the process moves to step S2611.

In step S2604, it is determined whether or not the "Save Location" in the print list 2700 is "Client Computer". If the "Save Location" is "Client Computer", the process moves to step S2605. If the "Save Location" is not "Client Computer" (i.e., is "Printer A" or "Printer B"), the process moves to step S2608.

In step S2605, the print instruction unit 604 reflects the print range set in the print list 2700 in the output settings information of the job data 700. In step S2606, the print instruction unit 604 transmits the job data 700 to the printer A or the printer B. In step S2607, it is determined whether or not all the job data items have been executed. If all the job data items have not been executed, the process moves to step S2604.

In step S2608, it is determined whether or not the printer engine 1504 has started processing a job data item immediately preceding the job data item to be executed now in the print order of the print list 2700. If the printer engine 1504 has started processing, the process moves to step S2609.

In steps S2609 and S2610, the print range set in the print list 2700 is designated, and an instruction to execute printing is transmitted to the printer A or the printer B. In the printer A or the printer B, when an instruction from the job management unit 1505 is received, the printing of the job data saved in the job data storage unit 1507 is executed by printer engine 1504.

In step S2611, the job list display unit 603 generates a print list 2800 (FIG. 28) of the job data items instructed to be printed. In step S2612, it is determined whether or not the "Save Location" in the print list 2800 is "Client Computer". If the "Save Location" is "Client Computer", the process moves to step S2613. If the "Save location" is not "Client Computer" (i.e., is "Printer A" or "Printer B"), the process moves to step S2614. In step S2613, the print instruction unit 604 transmits the job data 700 to the printer A or B. In step S2614, an instruction to execute printing is transmitted to the printer A or the printer B.

Example of Print List According to the Present Embodiment

FIGS. 27 and 28 are diagrams showing the print lists 2700 and 2800 produced when the job list display unit 603 receives a print instruction. The print list 2700 is a print list generated in step S2507 of FIG. 25A by reflecting the content set with the user interface of FIGS. 30A to 30C. The print list 2800 is a print list generated in step S2611 of FIG. 26.

User Interface for Output Settings According to the Present Embodiment

FIG. 29 is a diagram illustrating an example of a user interface displayed by the output settings display unit 601 upon receiving a print instruction from the user in the information processing system of the present embodiment. With the "Browse" button, a document to be transmitted to the printer 102 or 103 is selected. By pressing the "Print Settings" button, detailed output settings (not shown), such as the output paper size and paper output destination, can be made. The "Save Location" button is used only when "Save" is selected in the Output Method. Upon pressing the "Save Location" button, a user interface for setting the save location shown in FIG. 30A is displayed.

User Interface for Setting Save Location According to the Present Embodiment

FIG. 30A is a diagram illustrating an example of a user interface for setting the save location of job data displayed by the job list display unit 603 of the information processing system of the present embodiment. In FIG. 30A, upon pressing the "Add" button 3002 of the user interface 3001, an "Add Save Location" user interface 3003 is displayed. Here, an example is shown in which the user has input an instruction to save from page 3 to page 10 in the computer 101. In this case, the save location of the job data divided at the page level is displayed in a user interface 3004.

As described above, a configuration is made such that a single job data item is divided into a plurality of parts, the parts are saved in a plurality of locations, and the saved jobs into which the single job data item has been divided are printed collectively, whereby the operation of saving and printing job data can be achieved easily according to the user's needs and the characteristics of the job data.

It should be noted that the present invention may be applied in a system configured of a plurality of devices (e.g., a host computer, an interface device, a reader, a printer, etc.), or may be applied in an apparatus configured of a single device (e.g., a copy machine, a facsimile device, etc.). In addition, the object of the present invention can also be achieved by supplying a system or an apparatus with a storage medium in which program code that realizes the functionality of the above-mentioned embodiment is stored, and a computer of the system or apparatus loading and executing the program code stored in the storage medium. In this case, the program code loaded from the storage medium realizes the functionality of the above-mentioned embodiment, and the present invention is configured of the program code and the storage medium in which the program code is stored.

In addition, the case where an operating system (OS) running in a computer performs part or all of the actual processing based on the program code, and the functionality of the above-mentioned embodiment is realized by that processing, is included in the scope of the present invention. Further, the present invention can also be applied in the case where the program code loaded from the storage medium is written into a memory provided in a function expansion card installed in the computer or a function expansion unit connected to the computer. In such a case, a CPU or the like provided in the function expansion card or the function expansion unit performs part or all of the actual processing based on the program code, and the functionality of the above-mentioned embodiment is realized by that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2007-146106, filed on May 31, 2007, which is hereby incorporated by reference herein in its entirety.

What is claimed is:

1. An information processing apparatus comprising:
a print instruction receiving unit adapted to receive a print instruction to print target print data comprising a selected print data item from among a plurality of print data items saved in association with output settings in one or more data storage devices;
a determination unit adapted to determine whether or not the target print data comprises a plurality of selected print data items;
a selection receiving unit adapted to receive, in response to the determination unit determining that the target print data comprises the plurality of selected print data items, a selection of whether or not to confirm print settings of each selected print data item of the plurality of selected print data items, the selection applicable to all of the plurality of selected print data items;
a settings input unit adapted to, in response to the selection receiving unit receiving the selection to confirm print settings:
when a selected print data item of the plurality of selected print data items is stored in an apparatus other than a printer, display an output setting window for allowing a user to make different output settings for different selected print data items of the plurality of selected print data items and to designate a different printer to be used for different selected print data items of the plurality of selected print data items,
when a selected print data item of the plurality of selected print data items is stored in the printer, display an output setting window having no field for designating a printer for allowing a user to make different output setting for different selected print data items of the plurality of selected print data items, and
receive an input of output settings via the displayed output setting window for each selected print data item of the plurality of selected print data items and save, in one or more data storage devices, the received output settings as output settings associated with the corresponding selected print data items; and
a transmission unit adapted to transmit the plurality of selected print data items and the corresponding output settings associated with the plurality of selected print data items to a designated printer, after the settings input unit has initiated the saving.

2. The information processing apparatus according to claim 1, wherein the settings input unit is adapted to display the output settings associated with each selected print data item of the plurality of selected print data items and to receive a change to be made to the displayed output settings.

3. The information processing apparatus according to claim 1, wherein the one or more data storage devices, in which the plurality of print data items are saved, include (a) a data storage device that resides in the information processing apparatus, (b) a data storage device that resides in a device external to the information processing apparatus, or (c) a data storage device that resides in the information processing apparatus and a data storage device that resides in the device external to the information processing apparatus.

4. A method for controlling an information processing apparatus, the method comprising:
a print instruction receiving step of receiving a print instruction to print target print data target print data comprising a selected print data item from among a plurality of print data items saved in association with output settings in one or more data storage devices;
a determination step of determining whether or not the target print data comprises a plurality of selected print data items;
a selection receiving step of receiving, in response to the determination unit determining that the target print data comprises the plurality of selected print data items, a selection of whether or not to confirm print settings of each selected print data item of the plurality of selected print data items, the selection applicable to all of the plurality of selected print data items;
a settings input step of, in response to the selection receiving unit receiving the selection to confirm print settings:
when a selected print data item of the plurality of selected print data items is stored in an apparatus other than a printer, displaying an output setting window for allowing a user to make different output settings for different selected print data items of the plurality of selected print data items and to designate a different printer to be used for different selected print data items of the plurality of selected print data items,
when a selected print data item of the plurality of selected print data items is stored in the printer, displaying an output setting window having no field for designating a printer for allowing a user to make different output settings for different selected print data items of the plurality of selected print data items, and
receiving an input of output settings via the displayed output setting window for each selected print data item of the plurality of selected print data items and saving, in one or more data storage devices, the received output settings as output settings associated with the corresponding selected print data items; and a transmission step of transmitting the plurality of selected print data items and the corresponding output settings associated with the plurality of selected print data items to a designated printer, after the saving in the settings input step has been initiated.

5. The method for controlling an information processing apparatus according to claim 4, wherein the settings input step displays the output settings associated with each selected print data item of the plurality of selected print data items and receives a change to be made to the displayed output settings.

6. The method for controlling an information processing apparatus according to claim 4, wherein the one or more data storage devices, in which the plurality of print data items are saved, include (a) a data storage device that resides in the information processing apparatus, (b) a data storage device that resides in a device external to the information processing apparatus, or (c) a data storage device that resides in the information processing apparatus and a data storage device that resides in the device external to the information processing apparatus.

7. An information processing apparatus comprising:

a determination unit adapted to determine whether or not a plurality of jobs has been selected for printing;

a display unit adapted, in response to the determination unit determining that the plurality of jobs has been selected for printing:

to display a designation window for designating, with a designation applicable to all of the plurality of selected jobs, whether to carry out printing according to output settings set for each job of the plurality of selected jobs or to carry out printing after confirming output settings for each job of the plurality of selected jobs, and when it has been designated by the designation that printing is to be carried out after confirming output settings for each job of the plurality of selected jobs, to display an output settings window for setting output settings for each job of the plurality of selected jobs and for designating a different printer to be used for different selected jobs of the plurality of selected jobs when a selected job of the plurality of selected jobs is stored in an apparatus other than a printer, and to display an output settings window having no field for designating a printer for setting output settings when a selected job of the plurality of selected jobs is stored in the printer, the displayed output settings window allowing a user to make different output settings for different selected jobs of the plurality of selected jobs and to designate a different printer to be used for different selected jobs of the plurality of selected jobs; and a storage unit adapted to store, in one or more data storage devices, the output settings set with the displayed output settings window in association with the corresponding selected jobs.

8. The information processing apparatus according to claim 7, wherein the displayed output settings window is adapted to differ depending on a job save location.

9. The information processing apparatus according to claim 8, wherein the displayed output settings window is adapted to include a layout setting when a corresponding job of the plurality of selected jobs has not undergone particular processing by a device external to the information processing apparatus, and to not include the layout setting when a corresponding job of the plurality of selected jobs has undergone particular processing by the device external to the information processing apparatus.

10. An information processing method comprising:

a determination step of determining whether or not a plurality of jobs has been selected for printing;

a display step of:

displaying, in response to a determination in the determination step that the plurality of jobs has been selected for printing, a designation window for designating, with a designation applicable to all of the plurality of selected jobs, whether to carry out printing according to output settings set for each job of the plurality of selected jobs or to carry out printing after confirming output settings for each job of the plurality of selected jobs, and when it has been designated by the designation that printing is to be carried out after confirming output settings for each job of the plurality of selected jobs, displaying an output settings window for setting output settings for each job of the plurality of selected jobs and for designating a different printer to be used for different selected jobs of the plurality of selected jobs when a selected job of the plurality of selected jobs is stored in an apparatus other than a printer, and displaying an output settings window having no field for designating a printer for setting output settings when a selected job of the plurality of selected jobs is stored in the printer, the displayed output settings window allowing a user to make different output settings for different selected jobs of the plurality of selected jobs and to designate a different printer to be used for different selected jobs of the plurality of selected jobs; and a storage step of storing, in one or more data storage devices, the output settings set with the displayed output settings window in association with the corresponding selected jobs.

11. The information processing method according to claim 10, wherein the displayed output settings window differs depending on a job save location.

12. The information processing method according to claim 11, wherein the displayed output settings window includes a layout setting when a corresponding job of the plurality of selected jobs has not undergone particular processing by a device external to an information processing apparatus performing the information processing method, and does not include the layout setting when a corresponding job of the plurality of selected jobs has undergone particular processing by the device external to the information processing apparatus.

13. A non-transitory computer readable storage medium storing a program configured to cause at least a computer of an information processing apparatus to execute a method of controlling the information processing apparatus, the method comprising:

a print instruction receiving step of receiving a print instruction to print target print data target print data comprising a selected print data item from among a plurality of print data items saved in association with output settings in one or more data storage devices;

a determination step of determining whether or not the target print data comprises a plurality of selected print data items;

a selection receiving step of receiving, in response to the determination unit determining that the target print data comprises the plurality of selected print data items, a selection of whether or not to confirm print settings of each selected print data item of the plurality of selected print data items, the selection applicable to all of the plurality of selected print data items;

a settings input step of, in response to the selection receiving unit receiving the selection to confirm print settings:
when a selected print data item of the plurality of selected print data items is stored in an apparatus other than a printer, displaying an output setting window for allowing a user to make different output settings for different selected print data items of the plurality of selected print data items and to designate a different printer to be used for different selected print data items of the plurality of selected print data items,
when a selected print data item of the plurality of selected print data items is stored in the printer, displaying an output setting window having no field for designating a printer for allowing a user to make different output settings for different selected print data items of the plurality of selected print data items, and
receiving an input of output settings via the displayed output setting window for each selected print data item of the plurality of selected print data items and saving, in one or more data storage devices, the received output settings as output settings associated with the corresponding selected print data items; and a transmission step of transmitting the plurality of selected print data items and the corresponding output settings associated with the plurality of selected print data items to a designated printer, after the saving in the settings input step has been initiated.

14. A non-transitory computer readable storage medium storing a program configured to cause at least a computer to execute an information processing method comprising:

a determination step of determining whether or not a plurality of jobs has been selected for printing;

a display step of:
displaying, in response to a determination in the determination step that the plurality of jobs has been selected for printing, a designation window for designating, with a designation applicable to all of the plurality of selected jobs, whether to carry out printing according to output settings set for each job of the plurality of selected jobs or to carry out printing after confirming output settings for each job of the plurality of selected jobs, and
when it has been designated by the designation that printing is to be carried out after confirming output settings for each job of the plurality of selected jobs, displaying an output settings window for setting output settings for each job of the plurality of selected jobs and for designating a different printer to be used for different selected lobs of the plurality of selected jobs when a selected job of the plurality of selected jobs is stored in an apparatus other than a printer, and displaying an output settings window having no field for designating a printer for setting output settings when a selected job of the plurality of selected jobs is stored in the printer, the displayed output settings window allowing a user to make different output settings for different selected jobs of the plurality of selected jobs and to designate a different printer to be used for different selected jobs of the plurality of selected jobs; and a storage step of storing, in one or more data storage devices, the output settings set with the displayed output settings window in association with the corresponding selected jobs.

* * * * *